(12) United States Patent
Itsuki et al.

(10) Patent No.: US 8,251,513 B2
(45) Date of Patent: Aug. 28, 2012

(54) PROJECTOR APPARATUS

(75) Inventors: Hiroyuki Itsuki, Moriguchi (JP);
Yoshiaki Kurosawa, Moriguchi (JP)

(73) Assignee: SANYO Electric Co., Ltd.,
Moriguchi-shi (JP)

( * ) Notice: Subject to any disclaimer, the term of this patent is extended or adjusted under 35 U.S.C. 154(b) by 541 days.

(21) Appl. No.: 12/611,552

(22) Filed: Nov. 3, 2009

(65) Prior Publication Data

US 2010/0118279 A1 May 13, 2010

(30) Foreign Application Priority Data

Nov. 7, 2008 (JP) ................. 2008-286480

(51) Int. Cl.
*G03B 21/26* (2006.01)
(52) U.S. Cl. ...................................................... 353/54
(58) Field of Classification Search .............. 353/54–61, 353/100–102; 348/748; 359/512, 820; 362/294, 362/373, 547; 165/74, 75, 104.19
See application file for complete search history.

(56) References Cited

U.S. PATENT DOCUMENTS 4,453,810 A * 6/1984 Curiel ............................. 353/55

FOREIGN PATENT DOCUMENTS

| JP | 2005-121250 A | 5/2005 |
|----|---------------|--------|
| JP | 2008-112094 A | 5/2008 |

* cited by examiner

*Primary Examiner* — Georgia Y Epps
*Assistant Examiner* — Don Williams
(74) *Attorney, Agent, or Firm* — Westerman, Hattori, Daniels & Adrian, LLP

(57) ABSTRACT

The present invention provides a projector apparatus capable of ensuring stable operation, which is configured to efficiently cool an optical device by circulating air cooled by a cooling part of a refrigeration unit, and further to prevent moisture resulting from evaporation of dew adhered to the cooling part from adversely affecting the optical device when stopping the operation of the refrigeration unit. The optical chamber and the cooling chamber are enclosed respectively by adiabatic walls, the cooling chamber and the optical chamber are connected to each other through a cold air inlet port and a cold air outlet port, and the cold air inlet port and the cold air outlet port are provided with opening and closing mechanisms. In a cooling operation mode, the optical device is cooled with cold air by opening the opening and closing mechanisms, and upon stoppage of the cooling operation, the opening and closing mechanisms are closed to prevent the inflow of the moisture in the cooling chamber to the optical chamber.

14 Claims, 24 Drawing Sheets

Relation between external air temperature
and optical part temperature

Cooling chamber

Opened

Closed

PROJECTOR APPARATUS

BACKGROUND OF THE INVENTION

1. Field of the Invention

The present invention relates to a projector apparatus configured to process a light emitted from a light source by an optical device and project the processed light as a projection light image onto a screen through a projection lens.

2. Description of the Related Art

Conventionally, this type of projectors, for example, a liquid crystal projector comprises a light source, an optical device including a deflection plate, a liquid crystal panel and a prism, a projection lens and the like, which are mounted within a main body. The liquid crystal panel generally includes, as light bulbs, three liquid crystal panels corresponding to light's three primary colors for processing (modulating) each color light according to image information. The light emitted from the light source is separated into each color light, which is then processed (modulated) according to image information by each liquid crystal panel through the deflection plate, and composed into a projection light image through the prism or the like. The composed projection light image is enlarged and projected onto the screen by the projection lens.

Such a projector is associated with a risk of not being able to obtain a desired projection light image due to an adverse effect such as deformation on the optical device by the main body internally heated with the heat generated from the light source or the optical device. As a countermeasure against such an adverse effect, the heat of the optical device and the light source has been released by setting a plurality of fans within the main body and supplying (blowing) air (external air) outside the projector by each fan. In this case, the heat release with external air can be sufficiently performed in the light source since the light source reaches an extremely high temperature of about +900° C., while the optical device has a relatively low upper limit of operating temperature and, for example, the upper limit of operating temperature capable of ensuring stable operation without deformation or the like is as low as several tens degrees C. in use of a liquid crystal panel as the optical device. Therefore, the amount of heat release in this optical device is greatly influenced by the external air temperature. Namely, although the optical device can sufficiently release the heat to the supplied external air when the external air temperature is low, the amount of heat release must be ensured by increasing the air volume of the fans when the external air temperature is high. This results in problems such as remarkably increased power consumption in addition to increased noise by the operation of the fans.

Further, the problem of a so-called short cycle of air after heat release is also caused, in which although the external air which receives the heat is discharged to the outside, this discharged external air is sucked again by the fan and supplied to the projector, and a sufficient heat release effect cannot be obtained.

To solve such problems, for example, the following techniques for cooling the optical device including the liquid crystal panel have been proposed: a system for cooling the optical device with air cooled by a low-temperature part by providing a cooling device including the low-temperature part formed by a refrigeration cycle for circulating refrigerant (refer to Japanese Patent Application Laid-Open No. 2008-112094; Patent Document 1) and a system for cooling the optical device with low-temperature air created by electronic cooling (refer to Japanese Patent Application Laid-Open No. 2005-121250; Patent Document 2).

According to the system of Patent Document 1, dew condensation is caused on an evaporator that is the low-temperature part of the refrigeration cycle by the operation of the cooling device. Since the area for disposing the evaporator as the low-temperature part of the refrigeration cycle is not partitioned from the area for disposing the optical device in this system, dew adhered to the evaporator and/or dew fallen from the evaporator evaporate in accordance with a rise of ambient temperature upon stoppage of the operation of the cooling device, and resulting moisture adheres to the optical device, whereby the optical function is deteriorated. A detailed explanation of this phenomenon follows. Although the temperatures of the evaporator and the optical device naturally rise upon stoppage of the operation of the cooling device, the optical device including the prism is slow in temperature rise, and if the dew adhered to the evaporator and/or the dew fallen from the evaporator evaporate due to the rise of temperature of the evaporator in a state where the optical device is cooled, resulting moisture adheres to the optical device including the prism, causing the deterioration of the optical function. Particularly, the adhesion of the moisture to the prism causes deterioration of the composing function as projection light image, resulting in a situation such that a desired image cannot be obtained when the composed projection light image is enlarged and projected onto a screen by a projection lens.

Although the problem of the noise can be solved by the electronic cooling as disclosed in Patent Document 2, this electronic cooling is poor in energy efficiency, and requires a means for releasing heat to external air (heat sink or fan) in the vicinity of a cooling object since a heating part of the electronic cooling is integrally constituted, and a spatial restriction caused thereby leads to a remarkable deterioration of design flexibility. Further, when the electronic cooling operation is stopped, dew adhered to a cooling part of the electronic cooling evaporates, causing the same problem as in Patent Document 1.

According to the cooling system of Patent Document 1, a high cooling effect can be obtained since optical elements of a color composition optical system are locally forcedly cooled using the cooling device. However, the conventional projector apparatus further has the problem of a dew condensation countermeasure to be solved in addition to such a temperature countermeasure. Although this problem is never caused if a second section having the optical elements of the color composition optical system disposed therein is perfectly sealed and internally perfectly dehumidified in Patent Document 1, even a slight clearance allows penetration of humid external air during the operation, causing dew condensation on the surface of the optical elements of the color composition optical system after stopping the operation.

In the conventional projector apparatus containing the cooling system, a cooler (evaporator) of the cooling system faces a cold air circulating path for cooling the color composition optical system, and the cooler has a temperature equal to that of the color composition optical system during the operation of the apparatus. However, the temperature of the cooler immediately starts rising upon stoppage of the operation due to its high heat exchange efficiency, while the rise of temperature is delayed in the optical elements of the color composition optical system since a color composition prism and a condenser lens particularly have large heat capacities. In such a state, dew condensation water adhered to the cooler or dew condensation water collected in a dew condensation water storage part starts evaporating, and steam thereof adheres to the surface of the optical elements which are in a low-temperature state, compared with the cooler, or in a temperature state of dew condensation point or lower, causing the dew condensation thereon.

Such dew condensation on the surface of the color composition prism or the condenser lens obviously affects generation of projection light, and cleaning of the surface is also indispensable since stain or dust left on the surface after evaporation of the dew condensation deteriorates the quality of projection image. However, since the part in which each optical element is disposed is a structurally little part, the cleaning operation is not easy, and even if the cleaning operation is performed, the optical elements or wirings may be damaged. Therefore, this part is desired to be maintenance-free.

SUMMARY OF THE INVENTION

To solve such technical problems described above, the present invention is intended to provide a projector apparatus which can particularly effectively adapt a cooling device suitable for cooling of a large projector. Therefore, the present invention provides a projector apparatus capable of ensuring stable operation by combining a refrigeration cycle including a refrigerant compressor, and circulating air cooled by a cooling part thereof to an optical chamber to cool an optical device. The present invention involves a novel technique for preventing moisture resulting from evaporation of dew adhered to the cooling part from adversely affecting the optical device upon stoppage of the operation of the refrigeration cycle, and a configuration for effectively cooling the optical device of the projector by storing the optical device in an adiabatically-walled optical chamber.

The present invention is further intended to effectively cool, in a projector apparatus, a color composition prism, a capacitor lens and the like which are optical elements constituting a color composition optical system for generating projection light, while surely preventing dew condensation thereon after stopping the operation.

Means for solving the problems and concrete techniques thereof in the present invention will be described.

In a first aspect of the present invention, a projector apparatus comprises:

a light source;

an optical device for modulating a light emitted from the light source according to image information;

a projection lens for projecting the light modulated by the optical device as image light;

a cooling unit including a cooling part and a radiation part;

an optical chamber for housing the optical device;

a cooling chamber for housing the cooling part and supplying cold air heat-exchanged by the cooling part to the optical chamber; and a radiation chamber for housing the radiation part, the optical chamber and the cooling chamber connecting with each other through a cold air inlet port and a cold air outlet port while forming respectively heat-insulated spaces enclosed by adiabatic walls, wherein the projector apparatus further comprises opening and closing mechanisms for opening and closing both or one of the cold air inlet port and the cold air outlet port, a cold air circulation is performed in a cooling operation mode by opening the opening and closing mechanisms so that cold air cooled by the cooling part flows into the optical chamber through the cold air inlet port to cool the optical device therein, by means of a cold air circulating blower, and then returns to the cooling chamber through the cold air outlet port, and inflow of moisture in the cooling chamber to the optical chamber is prevented in a stopping mode of the cooling operation by closing the opening and closing mechanisms.

In a second aspect of the present invention, a projector apparatus comprises:

a light source;

an optical device for modulating a light emitted from the light source according to image information;

a projection lens for projecting the light modulated by the optical device as image light;

a cooling unit including a cooling part and a radiation part;

an optical chamber for housing the optical device;

a cooling chamber for housing the cooling part and supplying cold air heat-exchanged by the cooling part to the optical chamber; and a radiation chamber for housing the radiation part, the optical chamber and the cooling chamber connecting with each other through a cold air inlet port and a cold air outlet port while forming respectively heat-insulated spaces enclosed by adiabatic walls, and the cooling chamber including an external air introduction part for introducing external air outside the projector apparatus, wherein the projector apparatus is provided with a cooling operation mode for cooling the optical device by performing a cold air circulation such that cold air cooled by the cooling part flows into the optical chamber through the cold air inlet port to cool the optical device therein and then returns to the cooling chamber through the cold air outlet port; and a drying operation mode for drying the cooling chamber by introducing the external air from the external air introduction part into the cooling chamber.

In a third aspect of the present invention, a projector apparatus comprises:

a light source;

an optical device for modulating a light emitted from the light source according to image information;

a projection lens for projecting the light modulated by the optical device as image light;

a cooling unit including a cooling part and a radiation part;

an optical chamber for housing the optical device;

a cooling chamber for housing the cooling part and supplying cold air heat-exchanged by the cooling part to the optical chamber; and a radiation chamber for housing the radiation part, the optical chamber and the cooling chamber connecting with each other through a cold air inlet port and a cold air outlet port while forming respectively heat-insulated spaces enclosed by adiabatic walls, and the cooling chamber including an external air introduction part for introducing external air outside the projector apparatus, wherein the projector apparatus is provided with a cooling operation mode for cooling the optical device by performing a cold air circulation such that cold air cooled by the cooling part flows into the optical chamber through the cold air inlet port to cool the optical device therein, by means of a cold air circulating blower, and then returns to the cooling chamber through the cold air outlet port; an external air introduction mode for cooling the optical device with the external air taken by the external air introduction part; and a drying operation mode for drying the cooling chamber by introducing the external air from the external air introduction part into the cooling chamber, and the cooling operation state by the cooling part and the cooling operation state with the external air are switched based on temperature detection of an external air temperature sensor for detecting temperature of the external air.

In a fourth aspect of the present invention, a projector apparatus comprises:

a light source;

an optical device for modulating a light emitted from the light source according to image information;

a projection lens for projecting the light modulated by the optical device as image light;

a cooling unit including a cooling part and a radiation part;

an optical chamber for housing the optical device;

a cooling chamber for housing the cooling part and a cold air circulating blower, and supplying cold air heat-exchanged by the cooling part to the optical chamber; and a radiation chamber for housing the radiation part, the optical chamber and the cooling chamber connecting with each other through a cold air inlet port and a cold air outlet port while forming respectively heat-insulated spaces enclosed by adiabatic walls, the cooling chamber including an external air introduction part for introducing external air outside the projector apparatus, and the optical chamber connecting with the outside of the projector apparatus through an external air inlet port and an external air outlet port, wherein the projector apparatus further comprises opening and closing mechanisms for opening and closing the cold air inlet port, the cold air outlet port, the external air inlet port, and the external air outlet port, the projector apparatus is provided with operation modes based on the opening and closing control of the opening and closing mechanisms and the operation control of the cold air circulating blower, or a cooling operation mode by the cooling part for performing an air circulation such that cold air cooled by the cooling part flows into the optical chamber through the cold air inlet port to cool the optical device therein and then returns to the cooling chamber through the cold air outlet port; an external air introduction mode for cooling the optical device with the external air introduced into the optical chamber through the external air inlet port and then allowing the resulting air to flow to the outside of the projector apparatus through the external air outlet port; and a drying operation mode for drying the cooling chamber by introducing the external air into the cooling chamber, and the cooling operation state by the cooling part and the cooling operation state with the external air are switched based on temperature detection of an external air temperature sensor for detecting temperature of the external air.

In a fifth aspect of the present invention, a projector apparatus comprises:

a light source;

an optical device for modulating a light emitted from the light source according to image information;

a projection lens for projecting the light modulated by the optical device as image light;

a cooling unit including a cooling part and a radiation part;

an optical chamber for housing the optical device;

a cooling chamber for housing the cooling part and a cold air circulating blower, and supplying cold air heat-exchanged by the cooling part to the optical chamber, the cooling chamber being disposed adjacently to the optical chamber; and a radiation chamber for housing the radiation part and a radiating blower, the optical chamber and the cooling chamber connecting with each other through a cold air inlet port and a cold air outlet port while forming respectively heat-insulated spaces enclosed by adiabatic walls, the cooling chamber connecting with the outside of the projector apparatus through an external air inlet port and an external air outlet port, and the cooling chamber connecting with the radiation chamber through a vent port, wherein the projector apparatus further comprises opening and closing mechanisms for opening and closing the cold air inlet port, the cold air outlet port, the external air inlet port, the external air outlet port and the vent port, the projector apparatus is provided with operation modes based on opening and closing control of the opening and closing mechanisms, operation control of the cold air circulating blower, and operation control of the radiating blower, or a cooling operation mode by the cooling part for performing an air circulation such that cold air cooled by the cooling part flows into the optical chamber through the cold air inlet port to cool the optical device and then returns to the cooling chamber through the cold air outlet port; an external air introduction mode for allowing external air introduced into the cooling chamber through the external air inlet port to flow into the optical chamber through the cold air inlet port to cool the optical device therein and then allowing the resulting air to flow from the cold air outlet port to the radiation chamber through the vent port; and a drying operation mode for drying the cooling chamber by introducing the external air into the cooling chamber, and the cooling operation state by the cooling part and the cooling operation state with the external air are switched based on temperature detection of an external air temperature sensor for detecting temperature of the external air.

In a sixth aspect of the present invention, it is included in any one of the first to fifth aspects that the cooling unit is provided with a refrigeration circuit including a refrigerant compressor, a radiator, a refrigerant expander and a heat sink, the cooling part is set within the cooling chamber together with the cold air circulating blower, including the heat sink, and the radiation part is set within the radiation chamber together with the radiating blower, including the refrigerant compressor and the radiator, and is further provided with a radiating blower for the light source.

In a seventh aspect of the present invention, it is included in any one of the first to fifth aspects that the optical chamber is provided with a heating means, and the heating means is started when the operation of the cooling unit is stopped or when the light emission of the light source is stopped.

In an eighth aspect of the present invention, it is included in the sixth aspect of the invention that the optical chamber is provided with a heating means, and the heating means is started when the operation of the cooling unit is stopped or when the light emission of the light source is stopped.

In a ninth aspect of the present invention, it is included in the seventh aspect that the projector apparatus further comprises an auxiliary power source disposed out of the optical chamber, and the auxiliary power source supplies power to the heating means when supply of external power is shut down.

In a tenth aspect of the present invention, it is included in the eighth aspect that the projector apparatus further comprises an auxiliary power source disposed out of the optical chamber, and the auxiliary power source supplies power to the heating means when supply of external power is shut down.

In an eleventh aspect of the present invention, it is included in any one of the first to fifth aspects that the opening and closing mechanisms prevent the outflow of the cold air from the cooling chamber to the optical chamber when the operation of the cooling unit is stopped or when the light emission of the light source is stopped.

In a twelfth aspect of the present invention, it is included in the sixth aspect that the opening and closing mechanisms prevent the outflow of the cold air from the cooling chamber to the optical chamber when the operation of the cooling unit is stopped or when the light emission of the light source is stopped.

In a thirteenth aspect of the present invention, it is included in the ninth aspect that the opening and closing mechanisms prevent the outflow of the cold air from the cooling chamber to the optical chamber when the operation of the cooling unit is stopped or when the light emission of the light source is stopped.

In a fourteenth aspect of the present invention, it is included in the tenth aspect that the opening and closing mechanisms prevent the outflow of the cold air from the cooling chamber to the optical chamber when the operation of the cooling unit is stopped or when the light emission of the light source is stopped.

According to the present invention, dew condensation which is caused in a projector apparatus adapted to perform cooling by a cooling device using a refrigeration cycle can be solved. Since the projector apparatus is put into a cooling operation with external air when an external air region (ambient air region) of the projector apparatus has a low temperature, the operation of the cooling device using the refrigeration cycle can be suppressed to enhance the energy-saving effect.

According to the present invention, furthermore, a color composition prism, a capacitor lens and the like that are optical elements constituting a color composition optical system for generating projection light can be effectively cooled while surely preventing dew condensation thereon after stopping the operation.

DESCRIPTION OF THE PREFERRED EMBODIMENTS

The projector apparatus according to the present invention comprises:
a light source;
an optical device for modulating a light emitted from the light source according to image information;
a projection lens for projecting the light modulated by the optical device as image light;
a cooling unit including a cooling part and a radiation part;
an optical chamber for housing the optical device;

a cooling chamber for housing the cooling part and supplying cold air heat-exchanged by the cooling part to the optical chamber; and a radiation chamber for housing the radiation part, the optical chamber and the cooling chamber connecting with each other through a cold air inlet port and a cold air outlet port while forming respectively heat-insulated spaces enclosed by adiabatic walls, wherein the projector apparatus further comprises opening and closing mechanisms for opening and closing both or one of the cold air inlet port and the cold air outlet port, a cold air circulation is performed in a cooling operation mode by opening the opening and closing mechanisms so that cold air cooled by the cooling part flows into the optical chamber through the cold air inlet port to cool the optical device therein, by means of a cold air circulating blower, and then returns to the cooling chamber through the cold air outlet port, and inflow of moisture in the cooling chamber to the optical chamber is prevented in a stopping mode of the cooling operation by closing the opening and closing mechanisms.

[Embodiment 1]

Figure 1:
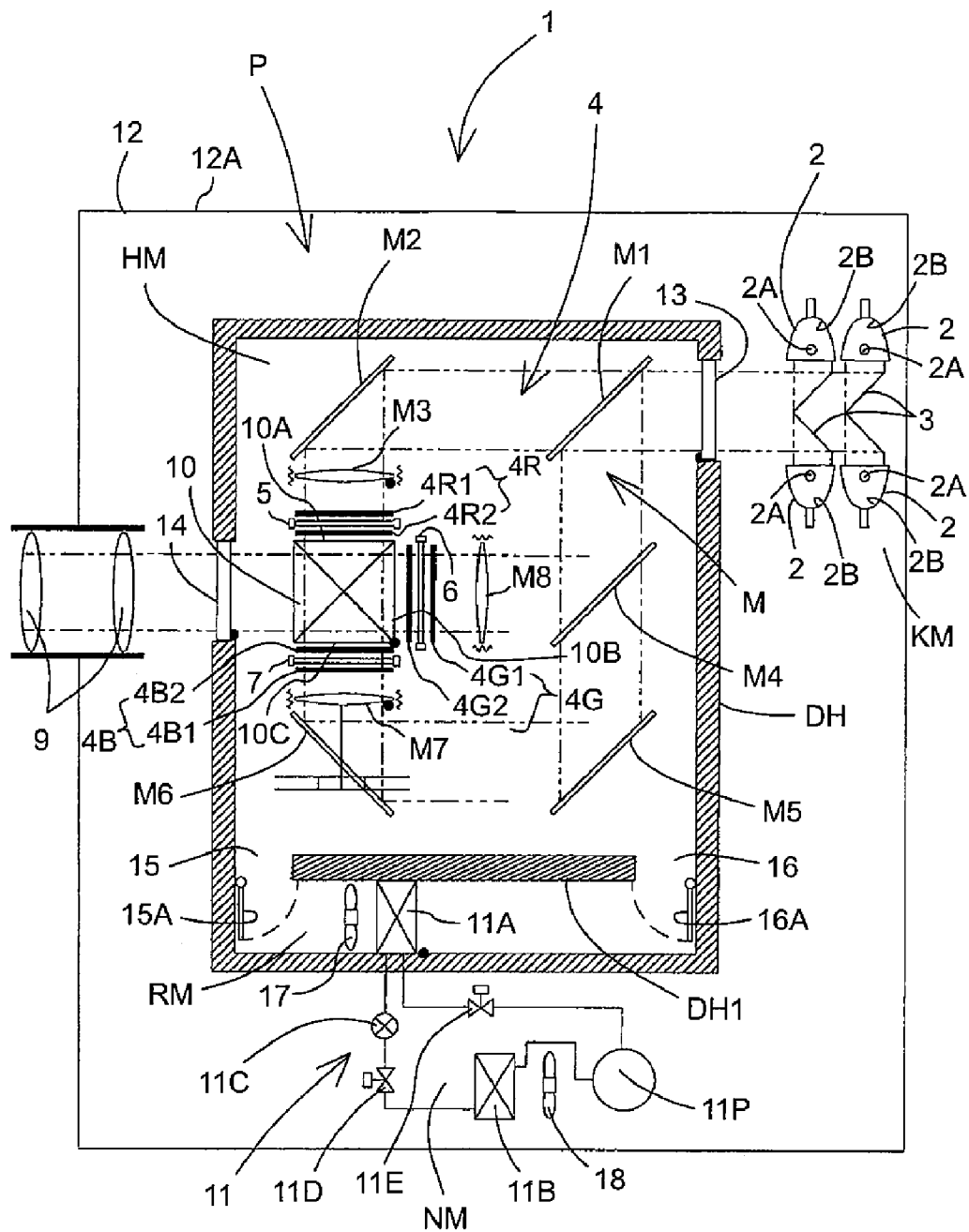
FIG. 1 is a view schematically showing a functional configuration in Embodiment 1 of a projector apparatus according to the present invention.
Figure 2:
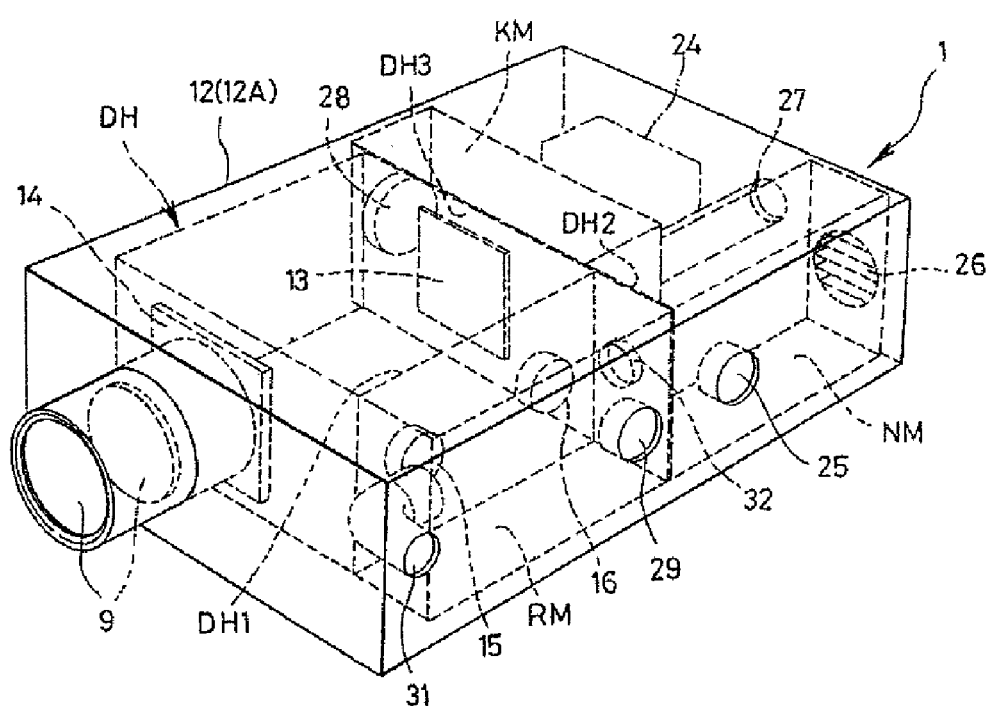
FIG. 2 is a perspective view showing one form of layout structure of each chamber in a box unit 12 shown in FIG. 1.
Figure 3:
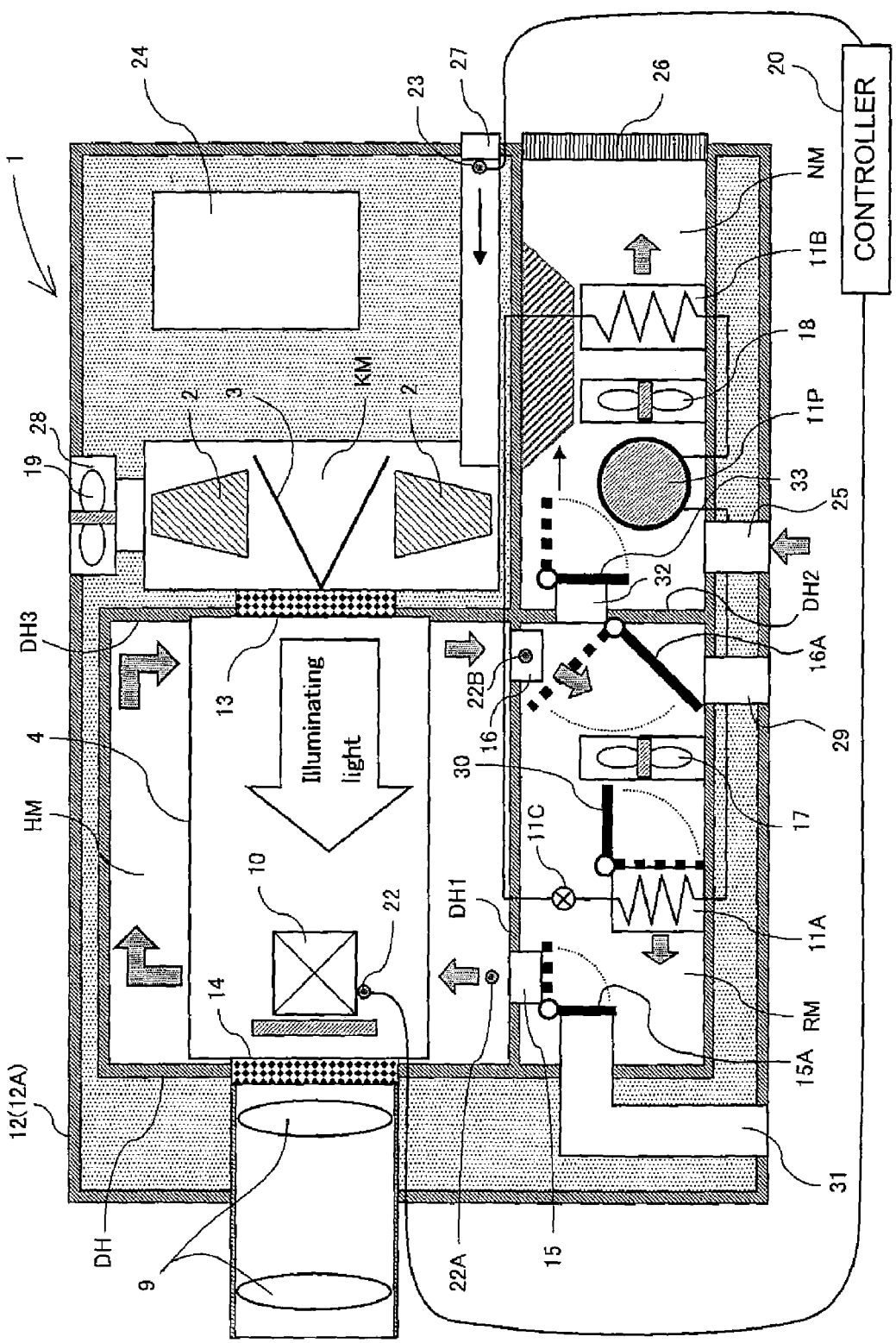
FIG. 3 is a transverse plan view showing the one form of layout structure of each chamber in the box unit 12 shown in FIG. 1.
Figure 4:
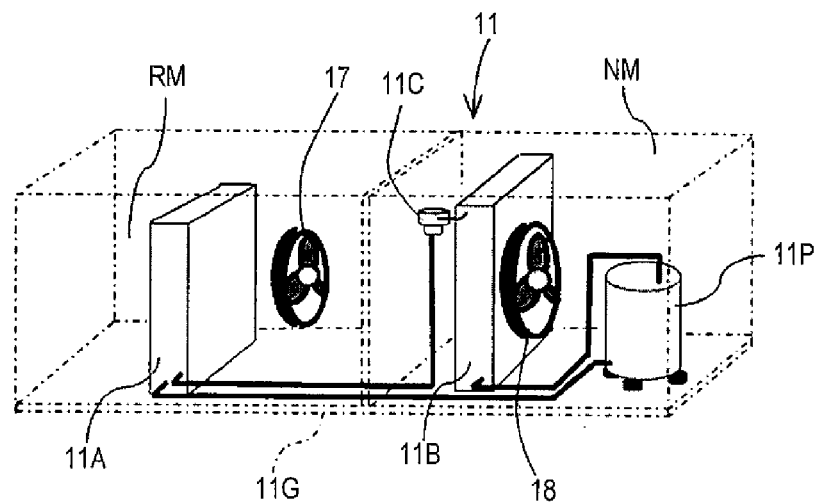
FIG. 4 is a structural view of a cooling unit 11 shown in FIG. 1.
Figure 5:
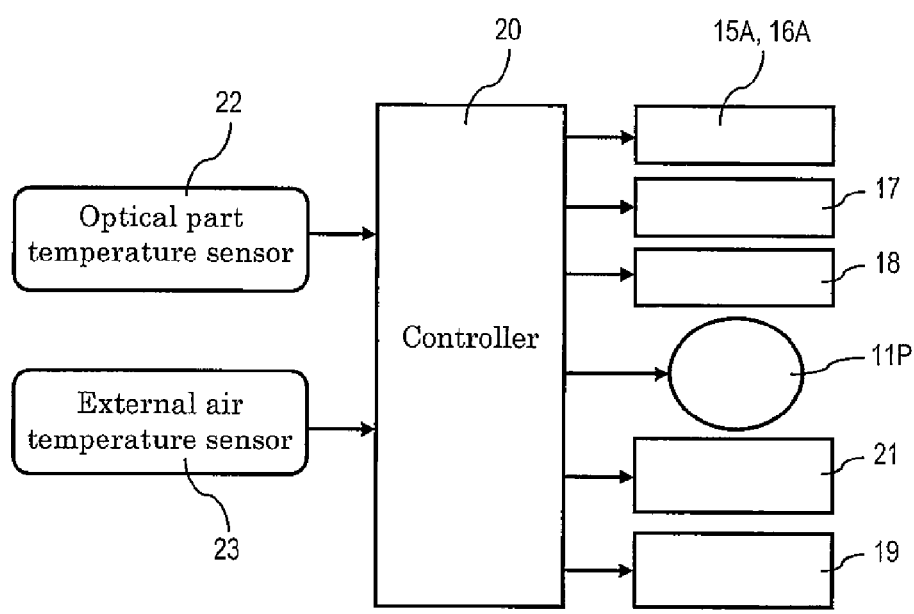
FIG. 5 is a control block diagram related to Embodiment 1 of the present invention.
Figure 6:
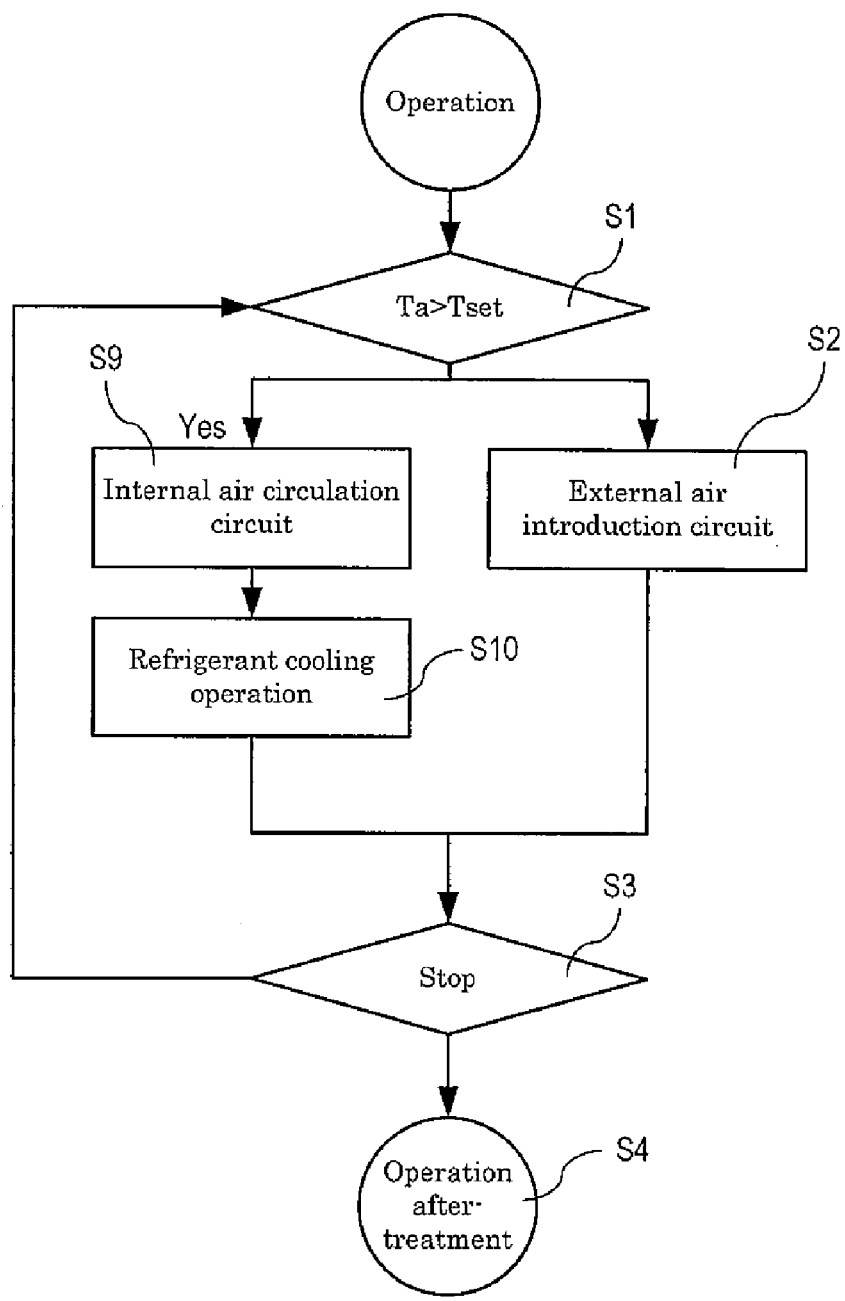
FIG. 6 is a control functional chart for control of an internal air circulation mode and an external air (ambient air) introduction mode by the cooling unit in Embodiment 1 of the present invention.
Figure 7:
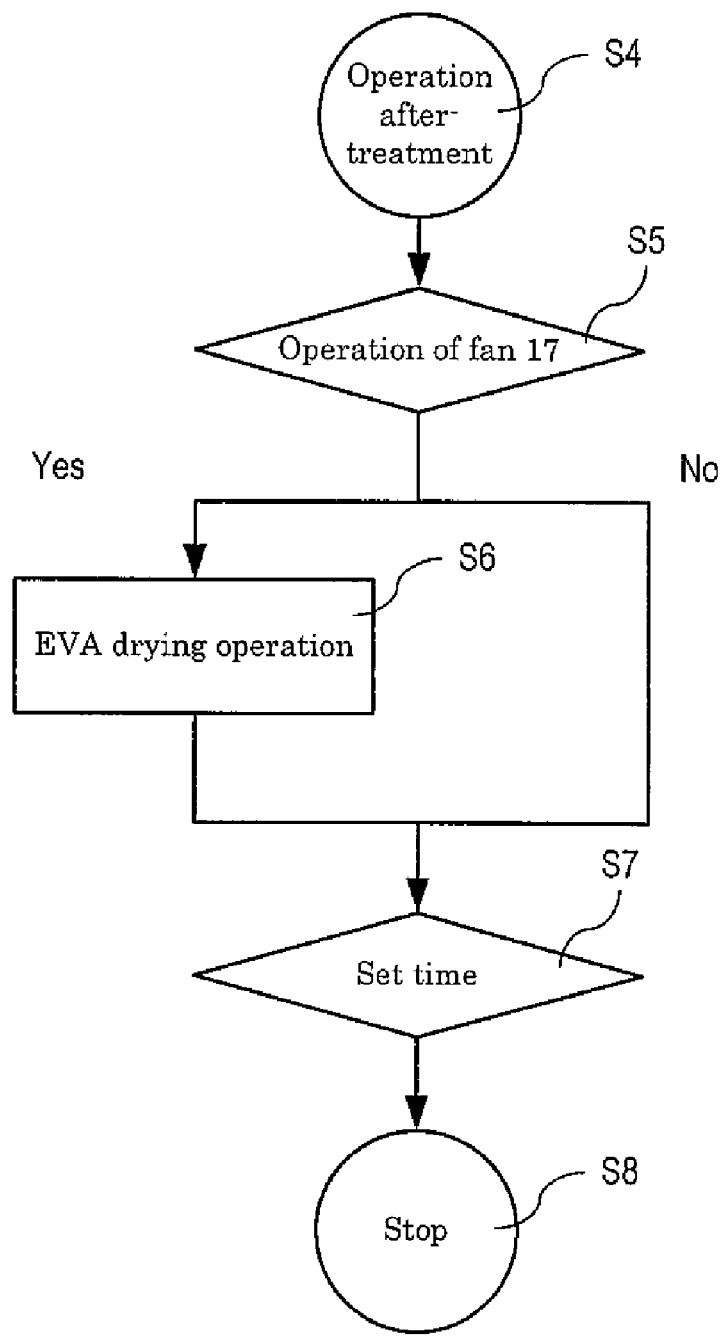
FIG. 7 is a functional chart for after-treatment operation (drying operation) after cooling operation in Embodiment 1 of the present invention.
Figure 8:
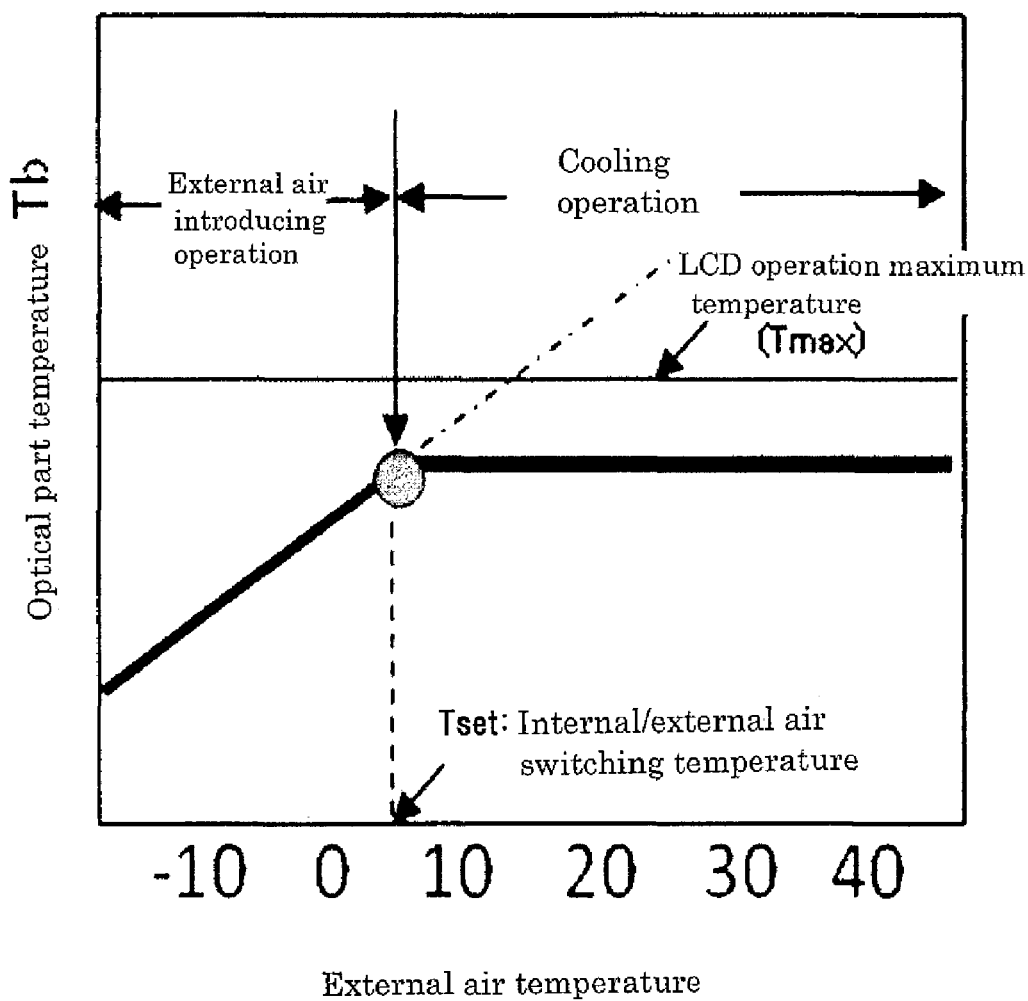
FIG. 8 is a relationship diagram of external air temperature and optical device part temperature in Embodiment 1 of the present invention.
Figure 9:
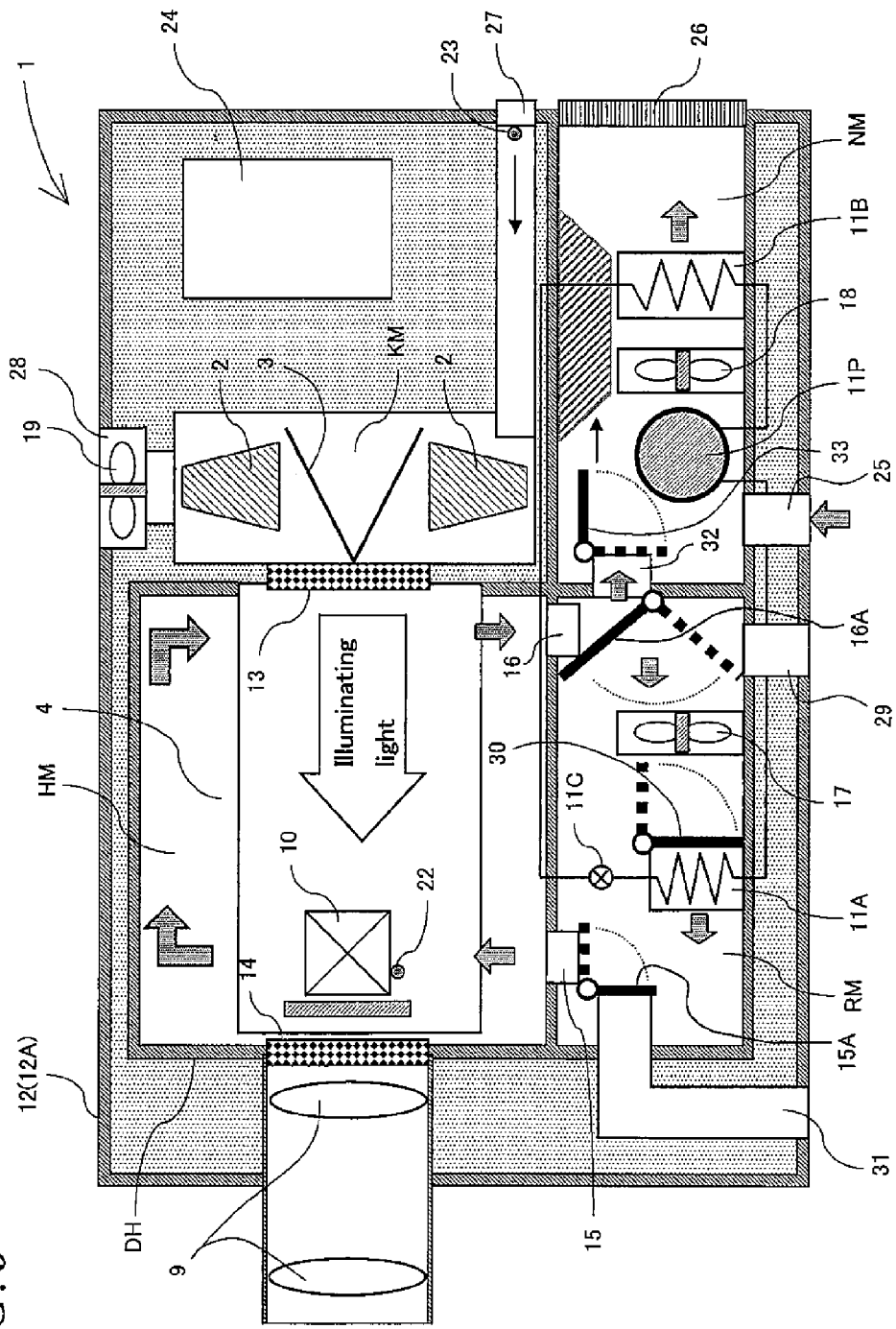
FIG. 9 is a view showing the state of each damper mechanism in the external air (ambient air) introduction mode in Embodiment 1 of the present invention.
Figure 10:
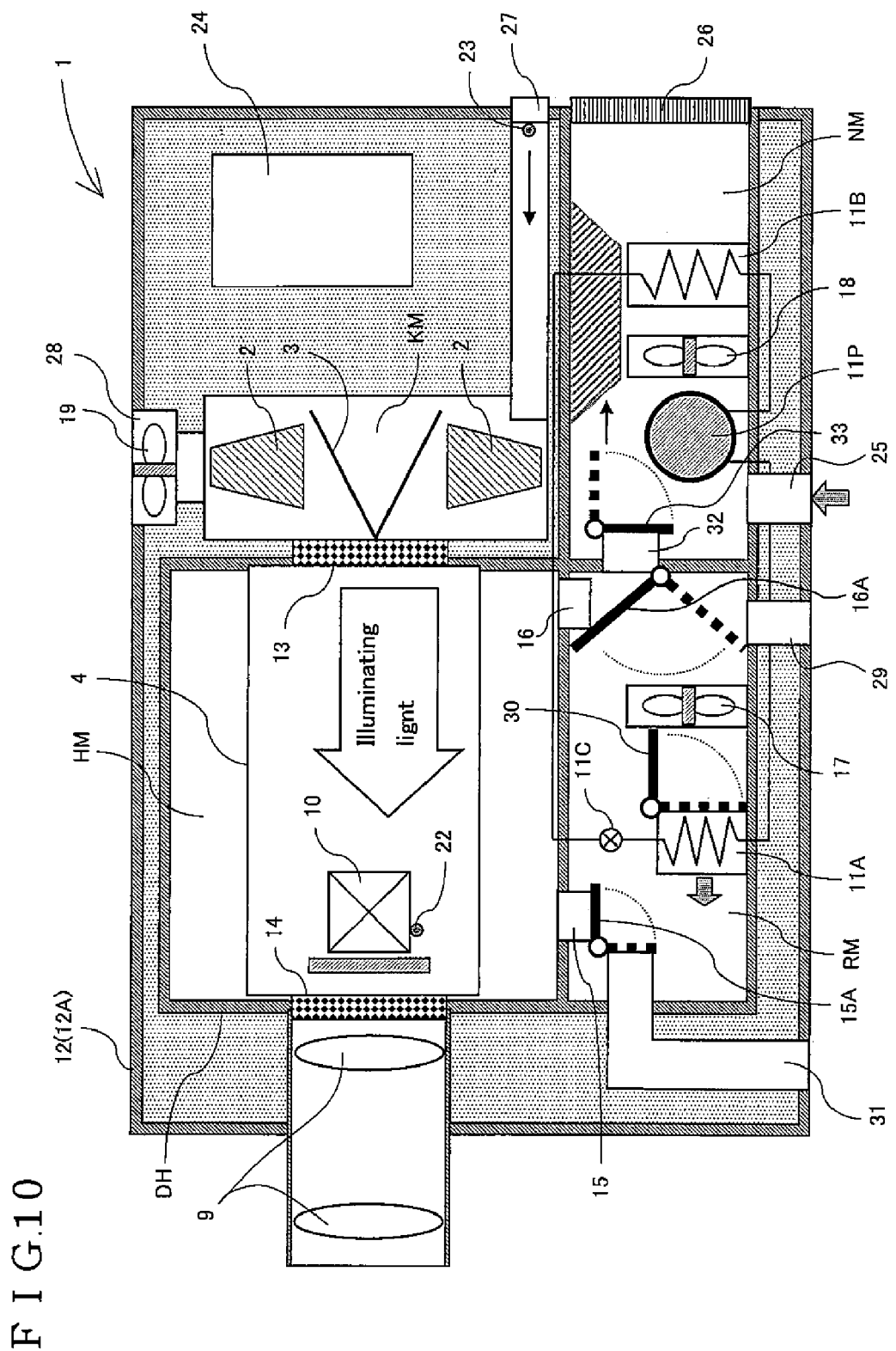
FIG. 10 is a view showing the state of each damper mechanism in a drying operation mode in Embodiment 1 of the present invention.
Figure 11:
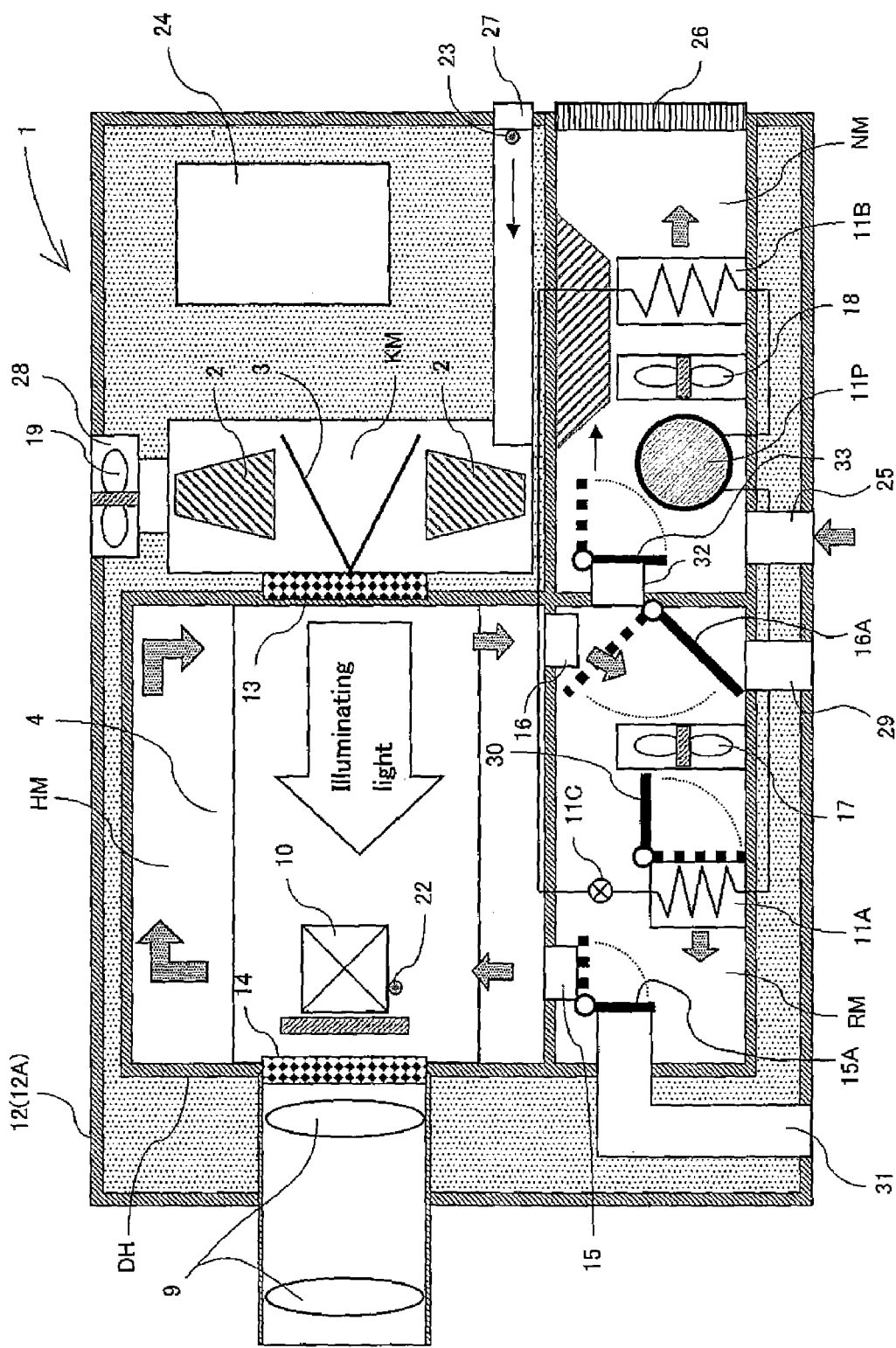
FIG. 11 is a view showing the state of each damper mechanism in the internal air circulation mode by operation of the cooling unit in Embodiment 2 of the present invention.
Figure 12:
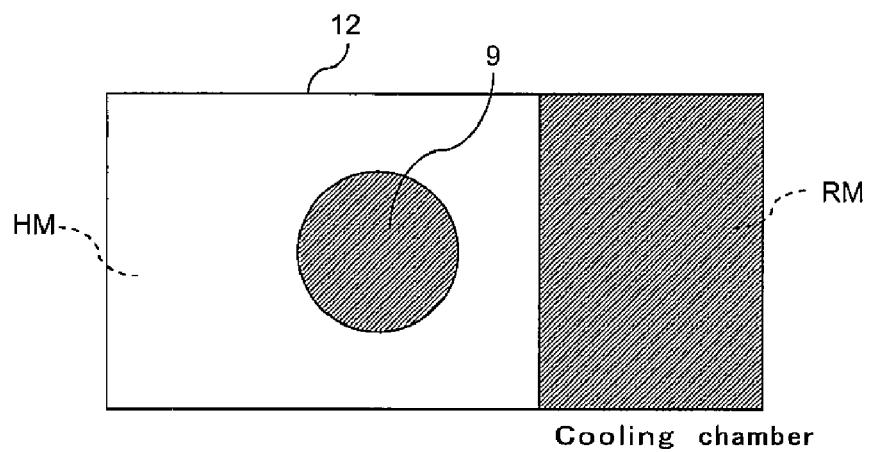
FIG. 12 is a front view showing a layout structure in Embodiment 1 of the present invention, in which a cooling chamber RM is disposed on the right of an optical chamber HM.
Figure 13:
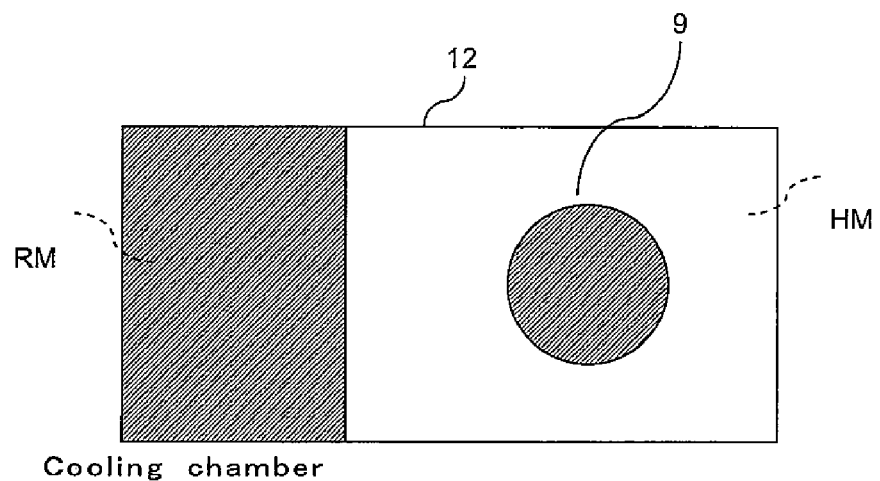
FIG. 13 is a front view showing a layout structure in Embodiment 1 of the present invention, in which the cooling chamber RM is disposed on the left of the optical chamber HM.
Figure 14:
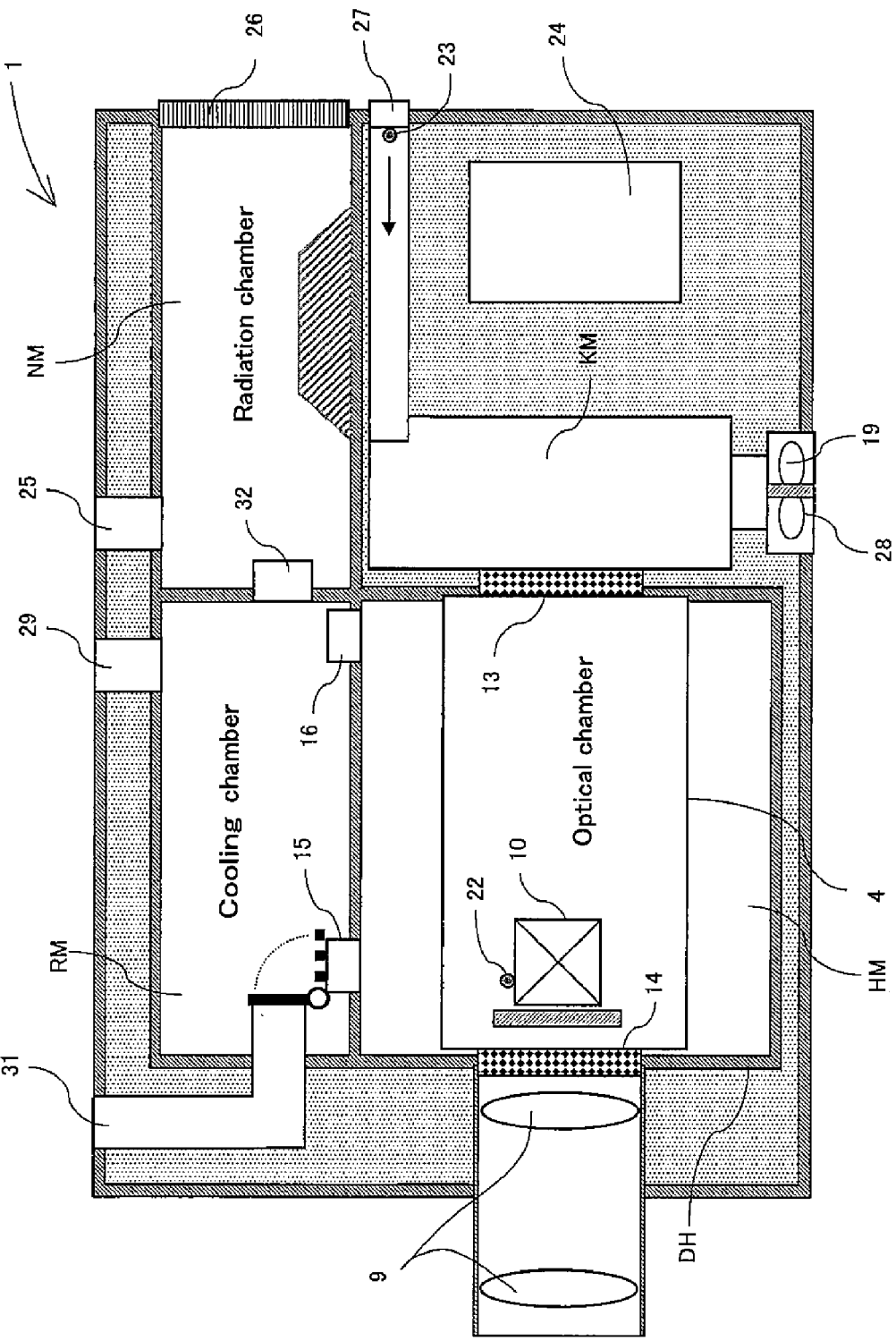
FIG. 14 is a transverse plan view of the box unit shown in FIG. 13.
Figure 15:
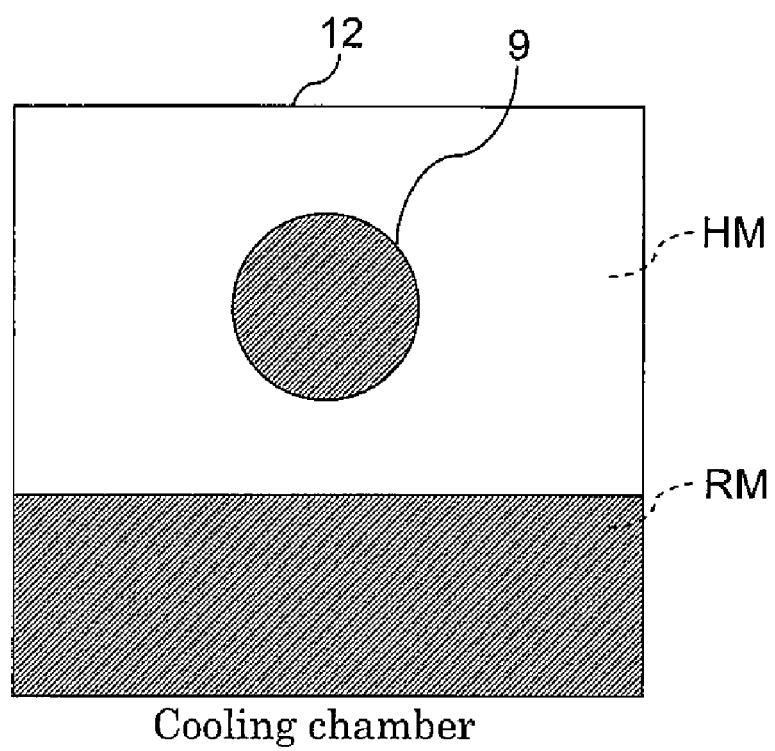
FIG. 15 is a front view showing a layout structure in Embodiment 1 of the present invention, in which the cooling chamber RM is disposed on the lower side of the optical chamber HM.
Figure 16:
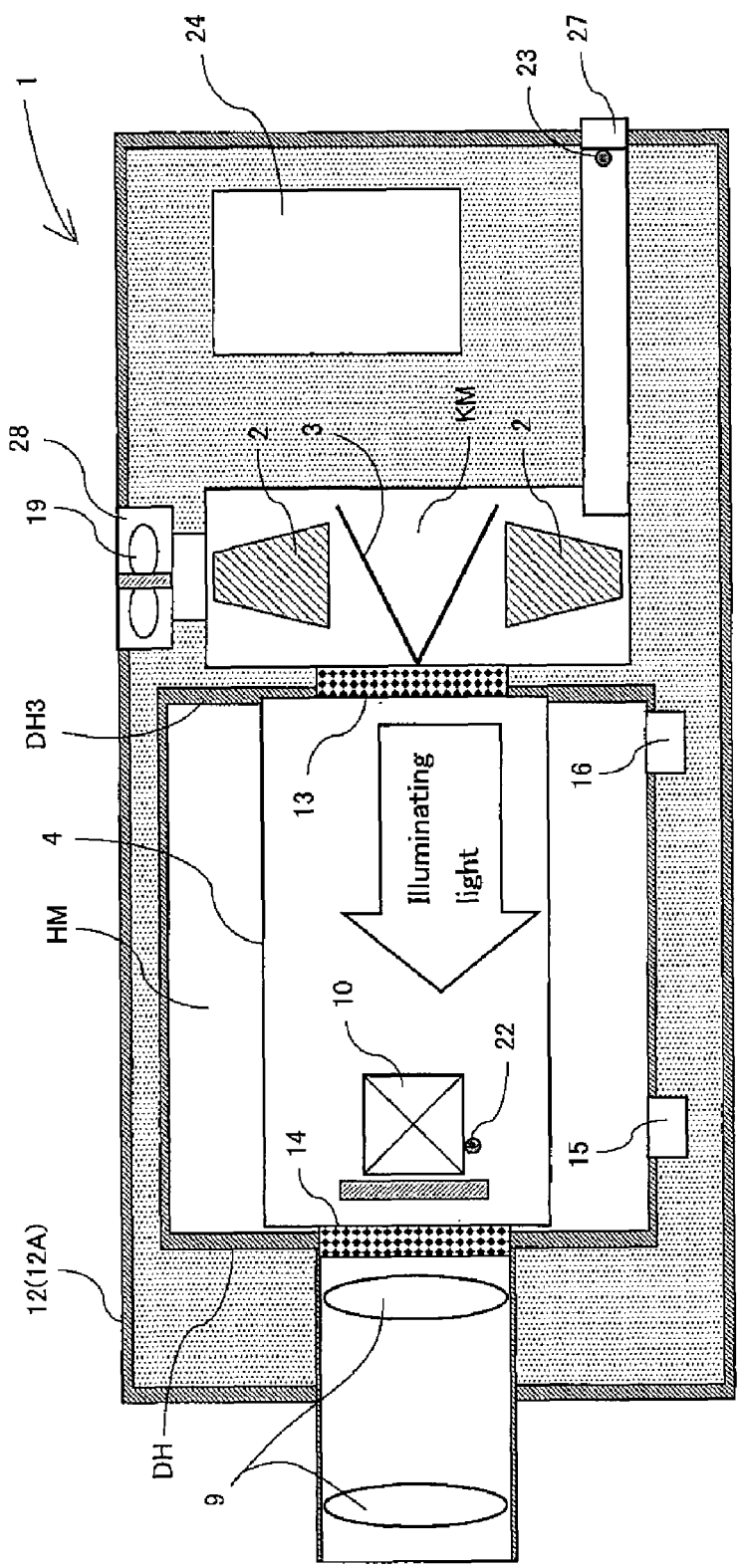
FIG. 16 is a transverse plan view of the box unit shown in FIG. 15.
Figure 17:
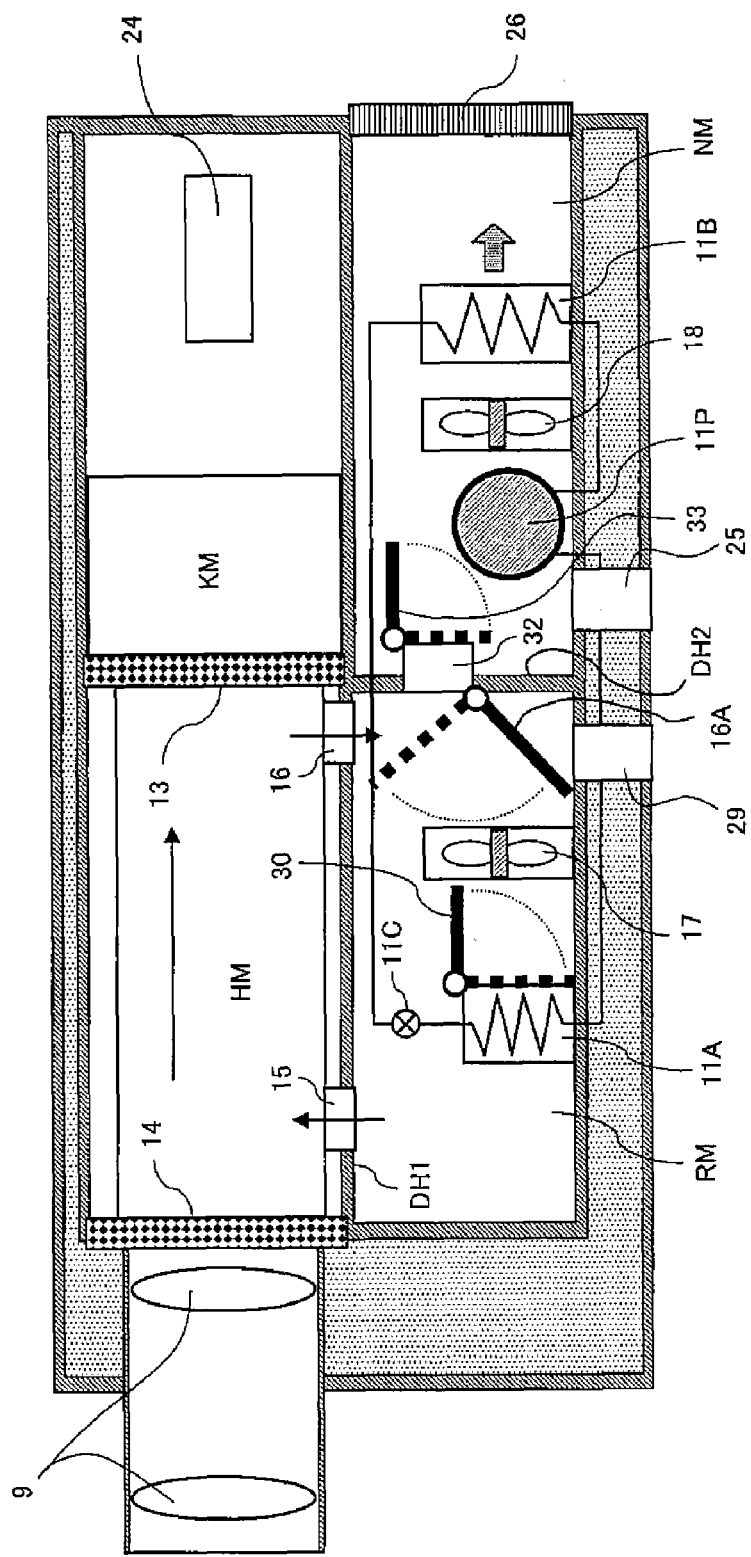
FIG. 17 is a vertical side view of the cooling chamber RM and a radiation chamber NM shown in FIG. 15.

FIG. 1 is a view schematically showing a functional configuration of a projector apparatus according to the present invention; FIG. 2 is a perspective view of one form of layout structure of each chamber in a box unit 12 according to the present invention; FIG. 3 is a transverse plan view of the one form of layout structure of each chamber in the box unit 12 according to the present invention; FIG. 4 is a structural view of a cooling unit according to the present invention; FIG. 5 is a control block diagram according to the present invention; FIG. 6 is a control functional chart for an internal air circulation mode and an external air (ambient air) introduction mode by the cooling unit; FIG. 7 is a functional chart for after-treatment operation (drying operation) after cooling operation; FIG. 8 is a relationship diagram between external air temperature and optical device part temperature; FIG. 9 is a view showing the state of each damper mechanism in the external air (ambient air) introduction mode; FIG. 10 is a view showing the state of each damper mechanism in a drying operation mode; FIG. 11 is a view showing the state of each damper mechanism in the internal air circulation mode by operation of the cooling unit; FIG. 12 is a front view of a layout structure in which a cooling chamber RM is disposed on the right of an optical chamber HM; FIG. 13 is a front view of a layout structure in which the cooling chamber RM is disposed on the left of the optical chamber HM; FIG. 14 is a transverse plan view of the box unit shown in FIG. 13; FIG. 15 is a front view of a layout structure in which the cooling chamber RM is disposed on the lower side of the optical chamber HM; FIG. 16 is a transverse plan view of the box unit shown in FIG. 15; and FIG. 17 is a vertical side view including the cooling chamber RM and a radiation chamber NM in the form of FIG. 15.

One preferred embodiment will be described based on the drawings. In the present invention, firstly, a technique for preventing the functional deterioration of an optical device resulting from evaporation of dew adhered to a cooling part in adoption of a system for cooling the optical device by providing a cooling device in order to eliminate the risk of not being able to obtain a desired projection light image by temperature rise of the optical device is described.

In reference to FIG. 1 schematically showing the functional configuration of a projector apparatus 1 with cooling function according to the present invention, an optical system of a projector P that is a main body part of the projector apparatus 1 with cooling function of the present invention comprises a light source 2, a uniform illumination optical system 3, a color separation optical system M, an optical device 4, and a projection lens 9. The light source 2 includes a lamp 2A such as an ultrahigh pressure mercury lamp or a metal halide lamp, and a reflector 2B for outputting a light (diverging light) emitted from the lamp 2A forward. The light source 2 in this embodiment is constituted by attaching reflectors 2B respectively to two or more (four) lamps 2A.

The uniform illumination optical system 3 for making the emitted light from the light source 2 into a parallel luminous flux having a uniform luminance distribution comprises a total reflecting lens, an integrator lens not shown, a condenser lens and the like. The color separation optical system M for separating the parallel luminous flux from the uniform illumination optical system 3 into color lights of three primary colors, or red R, green G and blue B comprises various mirrors for separating the parallel luminous flux from the uniform illumination optical system 3 to each color, a lens for guiding the separated luminous flux of each color to the optical device 4, and the like. The optical device 4 comprises a transmissive liquid crystal light bulb 4R for red R, a transmissive liquid crystal light bulb 4G for green G, and a transmissive liquid crystal light bulb 4B for blue B.

The color separation optical system M shown in the drawing will be described. In the color separation optical system M, the parallel luminous flux from the uniform illumination optical system 3 is guided to a first dichroic mirror M1, the first dichroic mirror M1 transmits light of a wavelength band of red R, and reflects light of a wavelength band of cyan (composition of green G and blue B). The light of the red R wavelength band which is transmitted by the first dichroic mirror M1 is changed in optical path by a reflection mirror M2 to pass through a lens M3, transmitted by the transmissive liquid crystal light bulb 4R for red R of the optical device 4, and thereby optically modulated. The light of the cyan (composition of green G and blue B) wavelength band which is reflected by the first dichroic mirror M1 is guided to a second dichroic mirror M4.

The second dichroic mirror M4 transmits light of a wavelength band of blue B and reflects light of a wavelength band of green G. The light of the blue B wavelength band which is transmitted by the second dichroic mirror M4 is changed in optical path by total reflection mirrors M5 and M6 to pass through a lens M7, transmitted by the transmissive liquid crystal light bulb 4B for blue B of the optical device 4, and thereby optically modulated. The light of the green G wavelength band which is reflected by the second dichroic mirror M4 is passed through a lens M8, transmitted by the transmissive liquid crystal light bulb 4G for green G of the optical device 4, and thereby optically modulated.

The transmissive liquid crystal light bulb 4R for red R includes a liquid crystal panel 5 disposed between an incident-side polarization plate 4R1 and an outgoing-side polarization plate 4R2. The transmissive liquid crystal light bulb 4G for green G includes a liquid crystal panel 6 disposed between an incident-side polarization plate 4G1 and an outgoing-side polarization plate 4G2. The transmissive liquid crystal light bulb 4B for blue B includes a liquid crystal panel 7 disposed between an incident-side polarization plate 4B1 and an outgoing-side polarization plate 4B2. The liquid crystal light bulb 4R, the liquid crystal light bulb 4G and the liquid crystal light bulb 4R are disposed respectively in opposition to three faces 10A, 10B and 10C of a cubic cross-dichroic prism (color composition prism) 10 so that the transmitting direction of the light transmitted by the liquid crystal panel and polarization plate of each bulb is intersected.

Therefore, an image light of red R modulated by passing through the transmissive liquid crystal light bulb 4R for red R, an image light of green G modulated by passing through the transmissive liquid crystal light bulb 4G for green G, and an image light of blue B modulated by passing through the transmissive liquid crystal light bulb 4B for blue B are composed by the cubic cross-dichroic prism 10 as color image information for forming a projection light image, and this color image information is enlarged and projected on a screen or the like by the projection lens 9.

In reference to FIG. 1 schematically showing the functional configuration of the projector apparatus 1 with cooling function according to the present invention, the projector apparatus 1 comprises a box unit 12 having a cubic main body 12A in which the projector P and a cooling unit 11 (cooling device 11) for cooling the projector are stored, the box unit 12 being disposed on the rear of the projection lens 9. The inside of the box unit 12 is partitioned into an adiabatically-walled optical chamber HM housing the optical device 4, an adiabatically-walled cooling chamber RM housing a cooling part 11A of the cooling unit 11, a radiation chamber NM housing a radiation part 11B of the cooling unit 11, and a light source chamber KM housing the light source 2, each of the cooling chamber RM and the optical chamber HM forming a heat-insulated chamber covered with an adiabatic wall DH. An incident part 13 through which the emitted light from the light source 2 travels to the optical device 4 is composed of a light transmissive plate such as glass mounted on the adiabatic wall DH of the optical chamber HM in a sealed state, and an outgoing part 14 through which the projection light image leaving the optical device 4 travels to the projection lens 9 is composed of a light transmissive plate such as glass mounted on the adiabatic wall DH of the optical chamber HM in a sealed state.

A cold air inlet port 15 and a cold air outlet port 16 are formed through a first adiabatic wall DH1 that is a partitioning wall between the cooling chamber RM and the optical chamber HM so that the optical chamber HM is cooled with cold air of the cooling chamber RM, and the cold air inlet port 15 and the cold air outlet port 16 are opened and closed respectively by opening and closing mechanisms (hereinafter referred to as damper mechanisms) 15A and 16A. The cooling unit 11 constitutes a refrigeration circuit, as shown in FIG. 4, so that refrigerant is compressed by a compressor 11P, condensed by a radiation part 11B which forms a radiator for condensing the compressed refrigerant to release heat, decompressed by a refrigerant expander 11C (a capillary tube or solenoid expansion valve), then evaporated by a cooling part 11A which forms a heat sink (called also an evaporator) for absorbing heat by the evaporation effect of the refrigerant, and returned again to the compressor 11P. Denoted at 11D is a solenoid valve which opens and closes a refrigerant passage between the radiation part 11B and the refrigerant expander 11C, and 11E is a solenoid valve which opens and closes a refrigerant passage between the heat sink 11A that is the cooing part 11A and the compressor 11P. The compressor 11P is set within the radiation chamber NM since it generates heat by operation.

FIG. 2 is a perspective view showing one form of layout structure of each chamber in the box unit 12 as one embodiment of the configuration of FIG. 1. In FIG. 2, the inside of the cubic main body 12A is partitioned into the optical chamber HM housing the optical device 4, the cooling chamber RM housing the cooling part 11A of the cooling unit 11, the radiation chamber NM housing the radiation part 11B of the cooling unit 11, and the light source chamber KM housing the light source 2, and each of the cooling chamber RM and the optical chamber HM forms a heat-insulated chamber with left, right, top and bottom sides covered with the adiabatic wall DH, whereby the cooling chamber RM and the optical chamber HM are disposed in a mutually heat-insulated relation.

FIG. 3 is a transverse plan view showing the one form of layout structure of each chamber in the box unit 12 and the internal structure thereof. In FIG. 3, each of the cooling chamber RM and the optical chamber HM forms a heat-insulated chamber with left, right, top and bottom sides covered with the adiabatic wall DH, with the light transmissive plate of the outgoing part 14 being mounted on the front adiabatic wall DH of the optical chamber HM in a sealed state and the light transmissive plate of the incident part 13 being mounted on the rear adiabatic wall DH of the optical chamber HM in a sealed state, the optical device 4 is located in the rear of the projection lens 9 so that the light transmissive plate of the outgoing part 14 is matched to the projection lens 9, the light source chamber KM is juxtaposed on the rear side of the optical chamber HM through a third adiabatic wall DH3, the radiation chamber NM is juxtaposed on the rear side of the cooling chamber RM through a second adiabatic wall DH2, the cooling chamber RM is juxtaposed on the right side of the optical chamber HM through a first adiabatic wall DH1 while maintaining the state where the radiation chamber NM is located on the rear side of the cooling chamber RM, and the radiation chamber NM is similarly juxtaposed on the right side of the light source chamber KM. The cold air inlet port 15 and the cold air outlet port 16 are formed through the first adiabatic wall DH1. According to this, the radiation chamber NM is distantly-positioned relative to the optical chamber HM, compared with the positions of the light source chamber KM and the cooling chamber RM relative to the optical chamber HM. In this form, the optical chamber HM, the cooling chamber RM and the radiation chamber NM are disposed respectively in a mutually heat-insulated relation. The cooling unit 11 has an integrated structure of the cooling chamber RM and the radiation chamber NM on a unit base member 11G, as shown in FIG. 4, in view of the easiness of assembling.

In order to perform a cold air circulation such that cold air cooled by the cooling part 11A is supplied to the optical chamber HM through the cold air inlet port 15 to cool the optical device 4 therein, and then returned to the cooling chamber RM through the cold air outlet port 16, the cooling chamber RM is provided with a cold air circulating blower 17 which is rotated by an electric motor. The cooling chamber RM is provided with an external air inlet port 29 and an external air outlet port 31 for introducing external air (ambient air) in an external air region (ambient air region) of the projector apparatus 1, and a damper mechanism 30 for opening and closing the air suction side of the cooling part 11A. A vent port 32 allowing the cooling chamber RM to connect with the radiation chamber NM is formed in the adiabatic partitioning wall between the cooling chamber RM and the radiation chamber NM, and the vent port 32 is opened and closed by a damper mechanism 33.

The radiation chamber NM is provided with a radiating blower 18 for releasing the heat generated by the radiation part 11B and the compressor 11P, the radiating blower being rotated by an electric motor. Air on the outside (hereinafter referred to as external air region (ambient air region)) of the projector apparatus 1 (hereinafter referred to as external air (ambient air)), which is sucked through an external air inlet port 25 of the radiation chamber NM, is discharged to the external air region (ambient air region) through an external air outlet port 26 by the operation of the radiating blower 18 after cooling the radiation part 11B and the compressor 11P. The light source chamber KM is provided with a radiating blower 19 for releasing the heat generated by the light source 2, the radiating blower being rotated by an electric motor. External air (ambient air) sucked through an external air inlet port 27 of the light source chamber KM is discharged to the external air region (ambient air region) through an external air outlet port 28 by operation of the radiating blower 19 after cooling the light source chamber KM. A power circuit part 24 of the projector apparatus 1 is preferably provided in a part of the light source chamber KM with or without being partitioned so as to release the heat generated by the power circuit part 24 also by the operation of the radiating blower 19.

FIG. 5 is a control block diagram by a controller 20. The optical chamber HM is provided with an optical part temperature sensor 22 for detecting temperature of the optical device 4. In order to prevent the deterioration of the optical function, in this embodiment, the optical part temperature sensor 22 detects temperature of the cross-dichroic prism 10. Further, an external air temperature sensor 23 is provided at the external air inlet port 27 of the light source chamber KM to detect the temperature of external air (ambient air) of the projector apparatus 1. A lamp (LED) 21 for displaying a state such as each operation mode is connected to the controller 20. The optical part temperature sensor 22 may be provided at a part 22A exposed to cold air in the cold air inlet port 15, and can be provided also in another part of the optical chamber HM or a part 22B exposed to cold air in the cold air outlet port 16.

In the present invention, the cold air circulating blower 17 for circulating cold air cooled by the cooling part 11A to the optical chamber HM in the cooling operation mode, and the opening and closing mechanisms (hereinafter referred to as damper mechanisms) 15A and 15B as a mechanism for preventing inflow of moisture in the cooling chamber RM into the optical chamber HM are provided. Their operations will be described. When current is carried to the power circuit part 24 to operate the projector apparatus 1, the light source 2 is lighted, and each of the other parts is electrified to operate. Although the cooling of the optical device 4 by the operation of the controller 20 is not needed when the temperature of the optical device 4 detected by the optical part temperature sensor 22 is lower than a predetermined temperature requiring the cooling, the optical device 4 must be cooled when the detected temperature is the predetermined temperature or higher since the functional deterioration of the optical device 4 may be caused. Therefore, in a state where the temperature of the optical device 4 detected by the optical part temperature sensor 22 is the predetermined temperature or higher, as shown in FIGS. 6 and 8, when an external air (ambient air) Ta detected by the external air temperature sensor 23 is lower than a set temperature Tset (e.g., 5° C.) based on comparison between the external air (ambient air) Ta and the set temperature Tset (e.g., 5° C.) (S1), the external air (ambient air) introduction mode is set (S2) since a sufficient cooling effect can be ensured by the external air (ambient air).

In the external air (ambient air) introduction mode, the cooling unit 11 is not operated, and the compressor 11P is stopped. The state of each damper mechanism is shown in FIG. 9. Namely, the damper mechanism 15A opens the cold air inlet port 15 and closes the external air outlet port 31. The damper mechanism 30 closes the air suction side of the cooling part 11A. The damper mechanism 16A is positioned upward as shown by the solid line to substantially open the external air inlet port 29. The damper mechanism 33 opens the vent port 32 as shown by the solid line. The cold air circulating blower 17, the radiating blower 18 and the radiating blower 19 are operated.

According to this, the external air (ambient air) enters into the cooling chamber RM through the external air inlet port 29, flows into the optical chamber HM through the cold air inlet port 15 to cool the optical device 4 therein, and then outflows to the radiation chamber NM through the cold air outlet port 16 and the vent port 32 while being guided by the damper mechanism 16A. The air passing through the vent port 32 and the external air (ambient air) sucked through the external air inlet port 25 are discharged to the external air region (ambient air region) through the external air outlet port 26 by the operation of the radiating blower 18. The external air (ambient air) sucked through the external air inlet port 27 of the light source chamber KM is discharged to the external air region (ambient air region) through the external air outlet port 28 by the operation of the radiating blower 19 after cooling the light source chamber KM. The optical device 4 is cooled by such a cooling operation state with external air of the optical device 4, and temperature-controlled to a maximum temperature Tmax (e.g., 80° C.) for stable operation of the optical device 4 or lower as shown in FIG. 8.

This temperature control is attained by the operation of the controller 20 based on the temperature detection of the optical part temperature sensor 22, for example, by ON-OFF control or rotating speed control of the cold air circulating blower 17 and the radiating blower 18. When the optical part temperature sensor 22 detects a predetermined low temperature, the operation of the cold air circulating blower 17 and the radiating blower 18 is stopped. When the temperature is raised due to this stoppage, and the optical part temperature sensor 22 detects the raised predetermined temperature, the operation of the cold air circulating blower 17 and the radiating blower 18 is restarted. Since the cooling operation state with external air is set when the external air region (ambient air region) of the projector apparatus has a low temperature, the operation of the cooling unit 11 constituting the refrigeration circuit can be suppressed to enhance the energy-saving effect. The cold air circulating blower 17 and the radiating blower 18 are OFF upon stoppage of the operation of the projector apparatus 1, and the cooling operation state of the optical device 4 by the external air (ambient air) introduction mode is stopped (S3). The operation mode is shifted to an operation after-treatment (drying operation described below) upon stoppage of the external air (ambient air) introduction mode (S4).

The operation after-treatment is shown in FIG. 7. The cooling unit 11 is not operated, and the compressor 11P is stopped. The state of each damper mechanism is shown in FIG. 10. Namely, the damper mechanism 15A closes the cold air inlet port 15 and opens the external air outlet port 31. The damper mechanism 30 opens the air suction side of the cooling part 11A as shown by the solid line. The damper mechanism 16A is positioned upward, as shown by the solid line, to substantially open the external air inlet port 29. The damper mechanism 33 closes the vent port 32 as shown by the solid line. The cold air circulating blower 17, the radiating blower 18 and the radiating blower 19 are in operation (S5).

According to this, external air (ambient air) is introduced into the cooling chamber RM through the external air inlet port 29, and dew adhered to each part of the cooling chamber RM is evaporated with the introduced external air (ambient air), and discharged to the external air region (ambient air region) through the external air outlet port 31. This is a drying operation mode for drying the cooling chamber RM (S6). This drying operation is continued for a set time of a timer set in the controller 20 (S7), and completed when the set time is over (S8). Since the moisture resulting from the evaporation of the dew adhered to each part of the cooling chamber RM is discharged to the external air region (ambient air region) through the external air outlet port 31 without flowing into the optical chamber HM by the presence of this drying operation mode, the risk of the evaporated moisture adhering to the optical device 4 can be eliminated. In the external air (ambient air) introduction mode, the introduction and discharge of external air (ambient air) may be performed by the operation of the cold air circulating blower 17 with the radiating blower 18 being OFF.

On the other hand, as shown in FIG. 6, when the external air (ambient air) Ta detected by the external air temperature sensor 23 is higher than the set temperature Tset (e.g., 5° C.) based on comparison between the external air (ambient air) Ta and the set temperature Tset (e.g., 5° C.) (S1) in a state where the temperature of the optical device 4 detected by the optical part temperature sensor 22 is the predetermined temperature requiring the cooling or higher, an internal air circulation mode that is a cooling operation mode by the cooling unit 11 is set (S9).

In this cooling operation mode or the internal air circulation mode, the cooling unit 11 is operated, and the compressor 11P is also operated. The evaporator constituting the cooling part 11A is cooled to a low temperature higher than 0° C. and lower than 10° C. such that the surface of the evaporator is never frosted, for example, to 5° C. The state of each damper mechanism is shown in FIG. 11. Namely, the damper mechanism 15A opens the cold air inlet port 15 and closes the external air outlet port 31. The damper mechanism 30 opens the air suction side of the cooling part 11A as shown by the solid line. The damper mechanism 16A is positioned downward, as shown by the solid line, to substantially close the external air inlet port 29. The damper mechanism 33 closes the vent port 32 as shown by the solid line. The cold air circulating blower 17, the radiating blower 18 and the radiating blower 19 are operated.

According to this, the cold air cooled by the cooling part 11A is circulated by the cold air circulating blower 17 to flow into the optical chamber HM through the cold air inlet port 15 to cool the optical device 4 therein, and then flow into the cooling chamber RM through the cold air outlet port 16 while being guided by the damper mechanism 16A, in which it is cooled again by the cooling part 11A. The optical device 4 is cooled in this way (S10). By this cold air circulation, the moisture in the air in the optical chamber HM is adhered to the evaporator constituting the cooling part 11A, causing dew condensation on the surface of the evaporator, and this dew falls down from the evaporator to a lower dew receiving part. The heat generated by the radiation part 11B and the compressor 11P of the radiation chamber NM is also released to the external air region (ambient air region) through the external air outlet port 26 by the operation of the radiating blower 18. The external air (ambient air) sucked through the external air inlet port 27 of the light source chamber KM is discharged to the external air region (ambient air region) through the external air outlet port 28 by the operation of the radiating blower 19 after cooling the light source chamber KM.

The optical device 4 is cooled by such a cooling operation state of the optical device 4 by the cooling unit 11 and temperature-controlled to the maximum temperature Tmax for stable operation of the optical device 4 or lower. This temperature control is attained by the operation of the controller 20 based on the temperature detection of the optical part temperature sensor 22, for example, by ON-OFF control or rotating speed control of the compressor 11P, the cold air circulating blower 17 and the radiating blower 18. When the optical part temperature sensor 22 detects a predetermined low temperature, the operation of the compressor 11P, the cold air circulating blower 17 and the radiating blower 18 is stopped. When the temperature is raised due to this stoppage, and the optical part temperature sensor 22 detects the raised predetermined temperature, the operation of the compressor 11P, the cold air circulating blower 17 and the radiating blower 18 is restarted. The compressor 11P, the cold air circulating blower 17 and the radiating blower 18 are OFF upon stoppage of the operation of the projector apparatus 1, and the cooling operation state of the optical device 4 by the external air (ambient air) introduction mode is stopped (S3). The operation mode is shifted to an operation after-treatment (drying operation described below upon stoppage of the external air (ambient air) introduction mode (S4).

The operation after-treatment is the same as the above. Namely, as shown in FIG. 7, the cooling unit 11 is not operated, and the compressor 11P is stopped. The state of each damper mechanism is shown in FIG. 10. Namely, the damper mechanism 15A closes the cold air inlet port 15 and opens the external air outlet port 31. The damper mechanism 30 opens the air suction side of the cooling part 11A as shown by the solid line in FIG. 10. The damper mechanism 16A is positioned upward, as shown by the solid line, to substantially close the cold air outlet port 16 and open the external air inlet port 29. The damper mechanism 33 closes the vent port 32 as shown by the solid line.

Since the cold air inlet port 15 and the cold air outlet port 16 are thus closed respectively by the damper mechanism 15A and the damper mechanism 16A, inflow of moisture to the optical chamber HM can be prevented even if the dew adhered to the evaporator constituting the cooling part 11A or dew fallen to the dew receiving part below the evaporator by the cooling operation is evaporated in this state, and the dew adhesion to the optical device 4 including the prism 10 can be thus prevented. The same holds for the configuration shown in FIG. 1. Although the inflow of the evaporated moisture to the optical chamber HM is prevented by closing both the cold air inlet port 15 and the cold air outlet port 16 respectively by the damper mechanisms 15A and 16A, either one of the cold air inlet port 15 and the cold air outlet port 16 may be closed by the damper mechanism if the air passage is configured to prevent the inflow of the evaporated moisture to the optical chamber HM by closing either one of the cold air inlet port 15 and the cold air outlet port 16. The damper mechanisms 15A and 16A are of a type of performing the opening and closing operation by energization/non-energization of an electric motor or an electromagnetic solenoid. Therefore, when the damper mechanism 15A and the damper mechanism 16A are adapted to close the cold air inlet port 15 and the cold air outlet port 16 by non-energization, the cold air inlet port 15 and the cold air outlet port 16 can be closed respectively by the damper mechanism 15A and the damper mechanism 16A even if a power plug of a power supply line of the projector apparatus 1 is pulled out of a plug socket by a user (manager) after use of the projector apparatus 1. Therefore, even if the dew adhered to the evaporator constituting the cooling part 11A or the dew fallen to the dew receiving part below the evaporator evaporates, the resulting moisture never flows into the optical chamber HM, and the dew adhesion to the optical device 4 including the prism 10 can be prevented.

The present invention is provided with a drying operation mode for forcedly evaporating the dew adhered to the evaporator constituting the cooling part 11A or the dew fallen to the dew receiving part below the evaporator as a control of the operation after-treatment (drying operation described below). Namely, in the structure of FIG. 3, each damper mechanism is operated as shown in FIG. 10, and the cold air circulating blower 17, the radiating blower 18 and the radiating blower 19 are in operation (S5 in FIG. 7). According to this, external air (ambient air) is introduced into the cooling chamber RM through the external air inlet port 29, and the dew adhered to the evaporator constituting the cooling part 11A is evaporated with the introduced external air (ambient air), and discharged to the external air region (ambient air region) through the external air outlet port 31. This is the drying operation mode for drying the cooling chamber RM (S6).

This drying operation is continued for a set time of a timer set in the controller 20 (S7), and is completed when the set time is over (S8). By the presence of the drying operation mode, the moisture resulting from evaporation of the dew adhered to the evaporator constituting the cooling part 11A is discharged to the external air region (ambient air region) through the external air outlet port 31 without flowing into the optical chamber HM. Therefore, since the cooling part 11A is dried, the projector apparatus 1 can be reoperated without adhesion of moisture to the optical device 4 by evaporation of the dew adhered to the cooling part 11A.

Since the drying operation of the cooling chamber RM is performed after completion of the cooling operation of the optical chamber HM to forcedly evaporate the dew adhered to the cooling part 11A, the cooling part 11A can be dried up. Therefore, the projector apparatus 1 of the present invention can exhibit, when reoperated, stable optical functions without the adhesion of moisture resulting from evaporation of the dew adhered to the cooling part 11A or the dew collected below the evaporator to the optical device 4, which can be caused without this drying operation function.

One form of the cooling system of the optical device 4 is to cool all of the prism 10, the liquid crystal panels 5, 6 and 7 and the polarization plates, as shown in FIG. 1, by allowing cold air introduced through the cold air inlet port 15 to flow into a single cooling space (optical chamber HM), the optical device 4 being constituted so as to make lights of light's primary colors (hereinafter referred to as red R, green G and blue B) separated in the color separation optical system M of the emitted light from the light source 2 into image light by the prism 10 through the liquid crystal panels 5, 6 and 7 and the polarization plates by disposing, in opposition to three faces of the cubic prism 10 having the three faces corresponding to red R, green G and blue B, the liquid crystal panels 5, 6 and 7 and the polarization plates so that the respective light transmitting directions are mutually intersected, and the optical chamber HM being composed of the single cooling space capable of housing all of the prism 10, and the liquid crystal panels 5, 6 and 7 and the polarization plates disposed in opposition to the three faces of the prism 10.

In the above-mentioned structure, the light source chamber KM is located on the rear side of the optical chamber HM, the radiation chamber NM is located on the rear side of the cooling chamber RM, the cooling chamber RM is juxtaposed on the right side surface of the optical chamber HM through the first adiabatic wall DH1 while maintaining the state in which the radiation chamber NM is located on the rear side of the cooling chamber RM, and the radiation chamber NM is similarly juxtaposed on the right side surface of the light source chamber KM. This layout is shown in FIG. 3, and a front view thereof is FIG. 12. Accordingly, the radiation chamber NM is distantly-positioned relative to the optical chamber HM, compared with the positions of the light source chamber KM and the cooling chamber RM relative to the optical chamber HM.

To attain the object of the present invention, layout structures other than the above-mentioned one can be adopted. One form of such structures is shown in FIGS. 13 and 14, in which the layout shown in FIGS. 3 and 12 is laterally reversed. A function part having the same form as in the above-mentioned structure is shown by the same reference number. Concretely, each of the cooling chamber RM and the optical chamber HM forms a heat insulated chamber with left, right, top and bottom sides covered with the adiabatic wall DH, the light transmissive plate of the outgoing part 14 is disposed on the front surface of the optical chamber HM, the light transmissive plate of the incident part 13 is disposed on the rear surface of the optical chamber HM, and the optical chamber HM is disposed backward the projection lens 9 so that the light transmissive plate of the outgoing part 14 faces the projection lens 9. The light source chamber KM is located on the rear side of the optical chamber HM, and the radiation chamber NM is located on the rear side of the cooling chamber RM. Further, while maintaining the state in which the radiation chamber NM is located on the rear side of the cooling chamber RM, the cooling chamber RM is juxtaposed on the left side surface of the optical chamber HM through the first adiabatic wall DH1, and the radiation chamber NM is juxtaposed on the left side surface of the light source chamber KM. According to this, the radiation chamber NM is distantly-located relative to the optical chamber HM, compared with the positions of the light source chamber KM and the cooling chamber RM relative to the optical chamber HM. The cooling unit 11 has an integrated structure of the cooling chamber RM and the radiation chamber NM on the unit base member 11G as shown in FIG. 4 in view of the easiness of assembling or the like.

To attain the object of the present invention, further other layout structures can be adopted. One form thereof is shown in FIGS. 15 and 16, in which the cooling chamber RM is located on the lower side of the optical chamber HM, and the radiation chamber NM is located on the lower side of the light source chamber KM. FIG. 15 is a front view in which the cooling chamber RM is disposed on the lower side of the optical chamber HM, FIG. 16 is a transverse plan view of the box unit 12 in FIG. 15, and FIG. 17 is a vertical side view including the cooling chamber RM and the radiation chamber NM of this form. A function part having the same form as in the above-mentioned structures is shown by the same reference number.

As a concrete structure of this form, the cooling chamber RM forms a heat insulated chamber with left, right, top and bottom sides covered with the adiabatic wall DH, and the optical chamber HM also forms a heat insulated chamber with left, right, top and bottom sides covered with the adiabatic wall DH. The light source chamber KM is located on the rear side of the optical chamber HM through a third adiabatic wall DH3, and the radiation chamber NM is located on the rear side of the cooling chamber RM through a second adiabatic wall DH2. Further, while maintaining the state in which the radiation chamber NM is located on the rear side of the cooling chamber RM, the cooling chamber RM is juxtaposed on the lower surface of the optical chamber HM through a first adiabatic wall DH1, and the radiation chamber NM is juxtaposed on the lower surface of the light source chamber KM. According to this, the radiation chamber NM is distantly-located relative to the optical chamber HM, compared with the positions of the light source chamber KM and the cooling chamber RM relative to the optical chamber HM. The light transmissive plate of the outgoing part 14 is mounted on the front adiabatic wall DH of the optical chamber HM, the light transmissive plate of the incident part 13 is mounted on the rear third adiabatic wall DH3 of the optical chamber HM, and the optical chamber HM is located backward the projection lens 9 so that the light transmissive plate of the outgoing part 14 faces the projection lens 9. The cooling unit 11 has an integrated structure of the cooling chamber RM and the radiation chamber NM on the unit base member 11G as shown in FIG. 4 in view of the easiness of assembling or the like.

[Embodiment 2]

Embodiment 2 is differed from Embodiment 1 in the structure for introducing external air (ambient air) into the optical chamber HM. In Embodiment 2, in order to directly introduce the external air (ambient air) into the optical chamber HM without passing through the cooling chamber RM, an external air inlet port 40 and an external air outlet port 41 are formed in the adiabatic wall DH opposite to the cooling chamber RM of the adiabatic walls of the optical chamber HM. Therefore, the vent port 32 for mutually connecting the cooling chamber RM and the radiation chamber NM is not present on the heat insulating partitioning wall between both the chambers, and the damper mechanism 33 is thus unneeded. The damper mechanism 30 is also unneeded.

Figure 18:
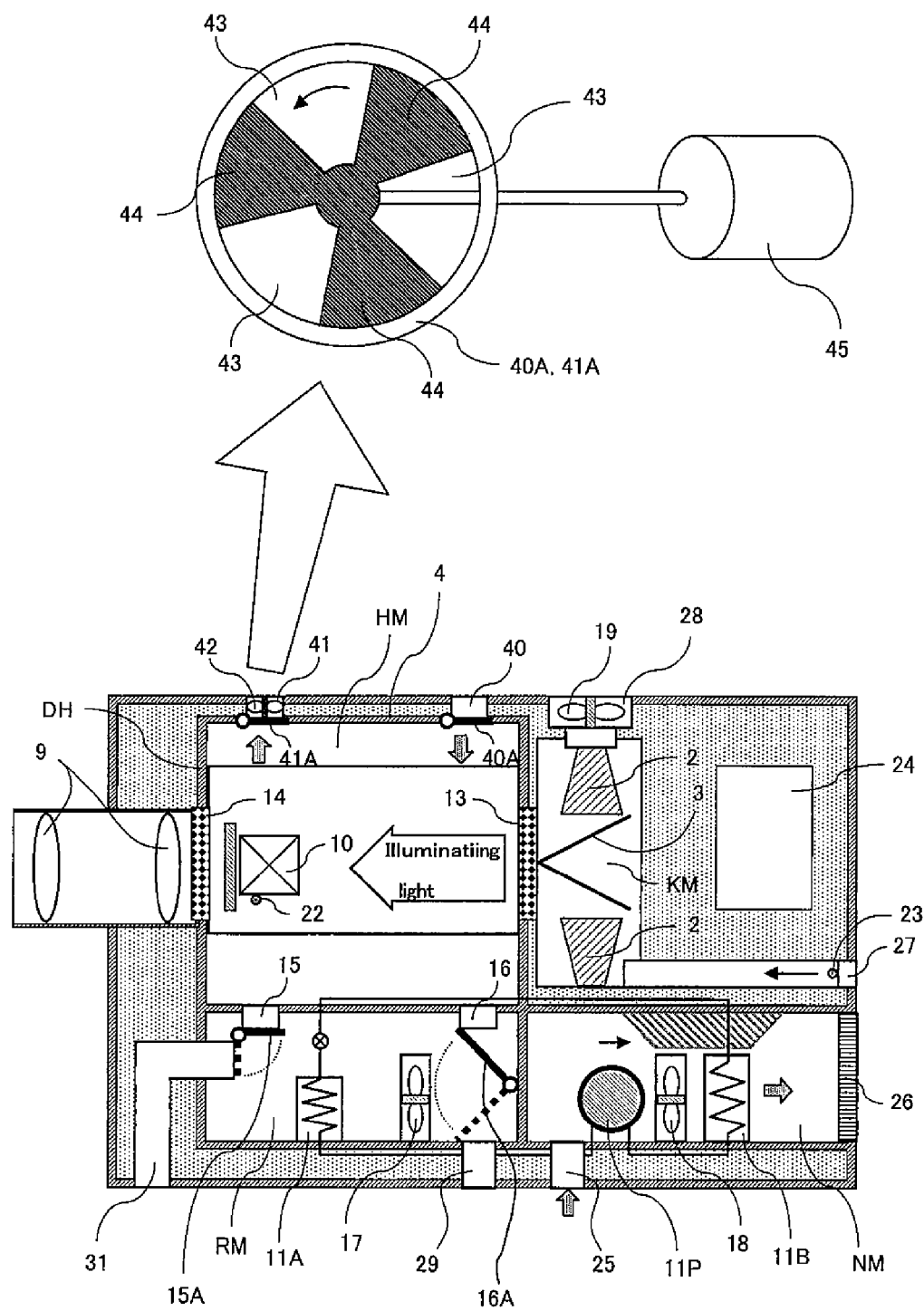
FIG. 18 is a view showing the state of each damper mechanism in the external air (ambient air) introduction mode in Embodiment 2 of the projector apparatus according to the present invention having a second form.
Figure 19:
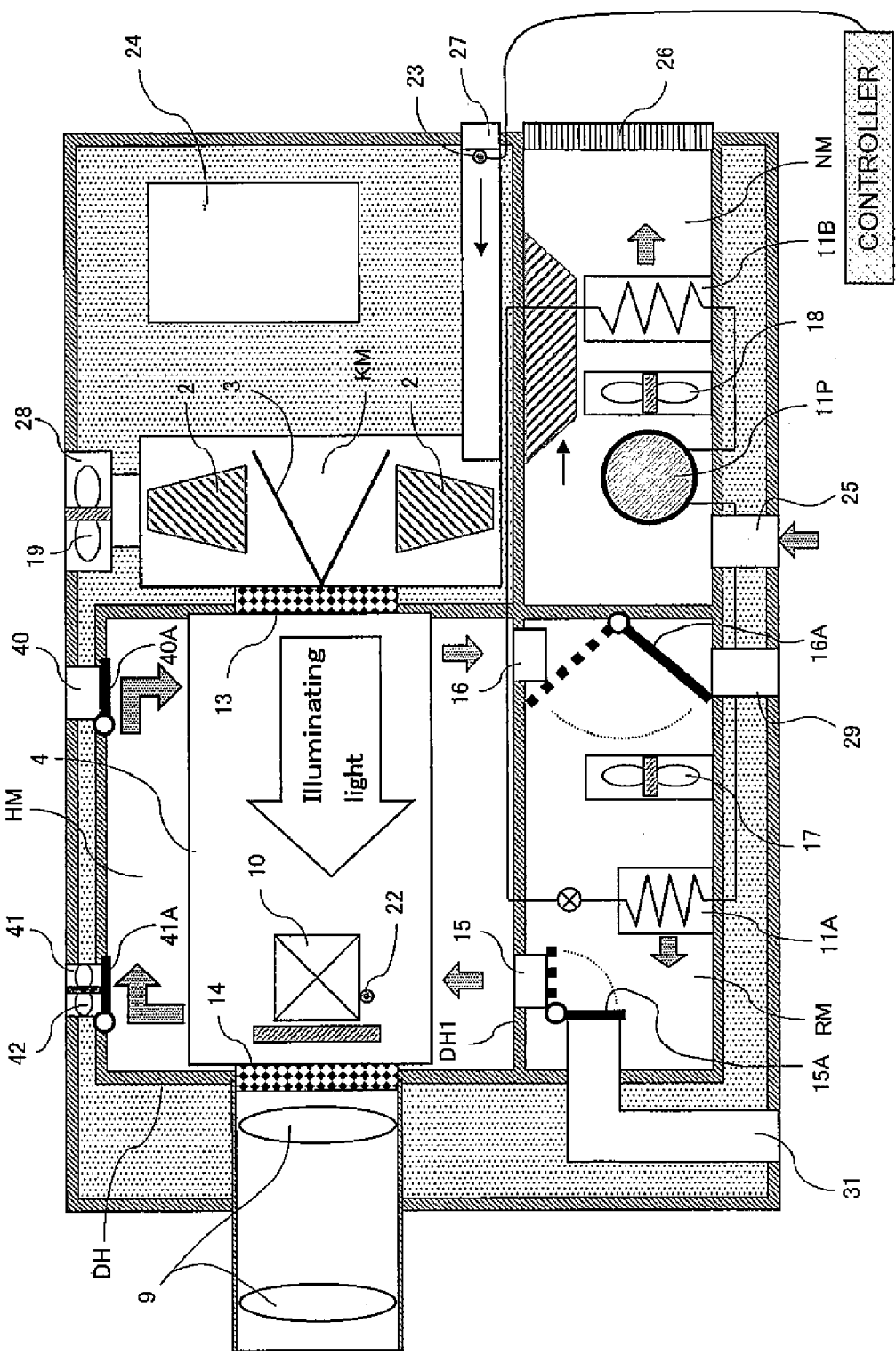
FIG. 19 is a view showing the state of each damper mechanism in an internal air circulation mode by operation of a cooling unit shown in FIG. 18 of the second form.

In FIGS. 18 and 19 having the same form of layout structure of each chamber as FIG. 3, a function part having the same form as in the configuration of Embodiment 1 is shown by the same reference number. FIG. 18 shows the state of each damper mechanism in the external air (ambient air) introduction mode, and FIG. 19 shows the state of each damper mechanism in the internal air circulation mode by operation of the cooling unit. In FIG. 18, the external air inlet port 40 and the external air outlet port 41 are provided respectively with damper mechanisms 40A and 41A, and the damper mechanisms 40A and 41A open the external air inlet port 40 and the external air outlet port 41 respectively. An external air circulating blower 42 provided on the external air inlet port 40 or the external air outlet port 41 is operated. The damper mechanism 15A closes the cold air inlet port 15, and the damper mechanism 16A closes the cold air outlet port 16. The operation of the cooling unit 11 is stopped, the cold air circulating blower 17 is also stopped, and the radiating blower 18 and the radiating blower 19 are operated. By this state, the optical device 4 in the optical chamber HM is cooled with external air (ambient air). After this cooling control, the damper mechanism 15A closes the cold air inlet port 15, and the damper mechanism 16A closes the cold air outlet port 16 and opens the external air inlet port 29, whereby inflow of moisture in the cooling part 11A or in the cooling chamber RM into the optical chamber HM is prevented. The drying operation mode is started in this state similarly to Embodiment 1, in which the compressor 11P is stopped, and the cold air circulating blower 17, the radiating blower 18 and the radiating blower 19 are in operation, and the drying operation of the cooling part 11A or the cooling chamber RM is performed by introducing the external air (ambient air) into the cooling chamber RM.

In the internal air circulation mode by the operation of the cooling unit, as shown in FIG. 19, the damper mechanisms 40A and 41A close respectively the external air inlet port 40 and the external air outlet port 41, the damper mechanism 15A opens the cold air inlet port 15, and the damper mechanism 16A opens the cold air outlet port 16. The operation of the external air circulating blower 42 is stopped, while the cooling unit 11 and the cold air circulating blower 17 are operated, and the radiating blower 18 and the radiating blower 19 are also operated. In this state, the optical device 4 in the optical chamber HM is cooled by the circulation of cold air cooled by the cooling part 11A of the cooling unit 11 similarly to Embodiment 1. After this cooling control, the damper mechanism 15A closes the cold air inlet port 15, and the damper mechanism 16A closes the cold air outlet port 16 and opens the external air inlet port 29, whereby the inflow of moisture in the cooling part 11A or the cooling chamber RM to the optical chamber HM is prevented. The drying operation mode is started in this state similarly to Embodiment 1, in which the compressor 11P is stopped, and the cold air circulating blower 17, the radiating blower 18 and the radiating blower 19 are in operation, and the drying operation of the cooling part 11A or the cooling chamber RM is performed by introducing the external air (ambient air) into the cooling chamber RM.

Figure 20:
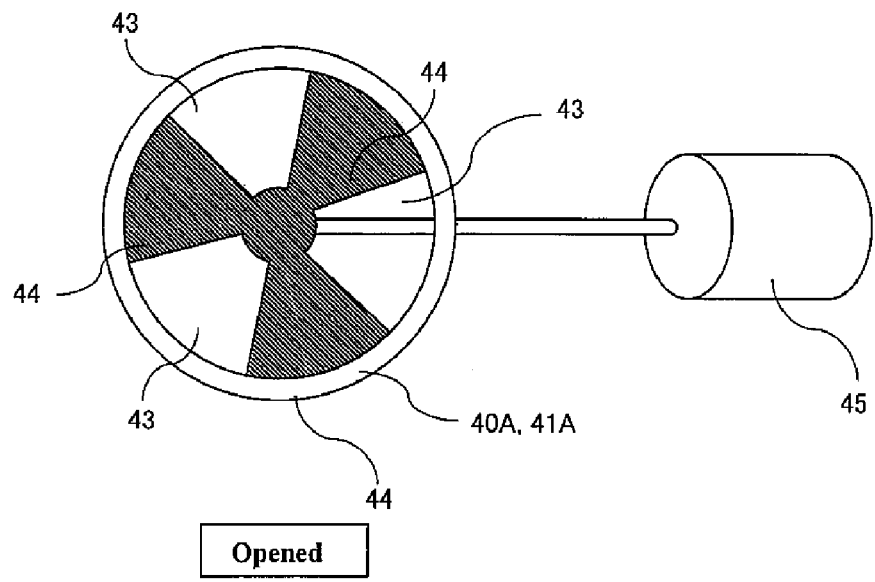
FIG. 20 is a view showing a state where an opening and closing plate (shutter) of a damper mechanism shown in FIGS. 18 and 19 is opened.
Figure 21:
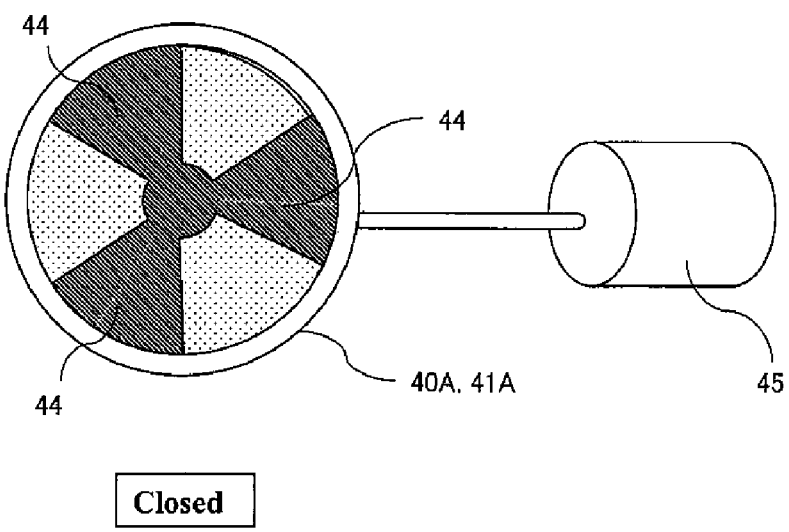
FIG. 21 is a view showing a state where the opening and closing plate (shutter) of the damper mechanism shown in FIGS. 18 and 19 is closed.

In each of the above-mentioned Embodiment 1 and Embodiment 2, although each of the damper mechanisms 15A, 16A, 30, 33, 40A and 41A is of a type of opening and closing an opening and closing plate rotatably pivoted at one end thereof by energization/non-energization of an electric motor or electromagnetic solenoid, the damper mechanism may be of a type of rotating an opening and closing plate (shutter) 44 for opening and closing an air passage 43 (cold air inlet port 15 or the like) instead by an electric motor 45 as shown in FIGS. 20 and 21. The air passage 43 is opened by the opening and closing plate (shutter) 44 for opening and closing the air passage 43 in the state shown in FIG. 20, and the air passage 43 is closed by rotating the opening and closing plate (shutter) 44 by the electric motor 45 in the state shown by FIG. 21.

[Embodiment 3]

In Embodiment 1 and Embodiment 2, the optical chamber HM is composed of a single cooling space capable of housing all of the prism 10, and the liquid crystal panels and polarization plates disposed respectively in opposition to three faces (incident surface of image light of red R, incident surface of image light of green G, and incident surface of image light of blue B) of the prism 10, so that all of the prism 10, the liquid crystal panels and the polarization plates are cooled by allowing the cold air introduced through the cold air inlet port 15 to flow into this cooling space (optical chamber HM).

Figure 22:
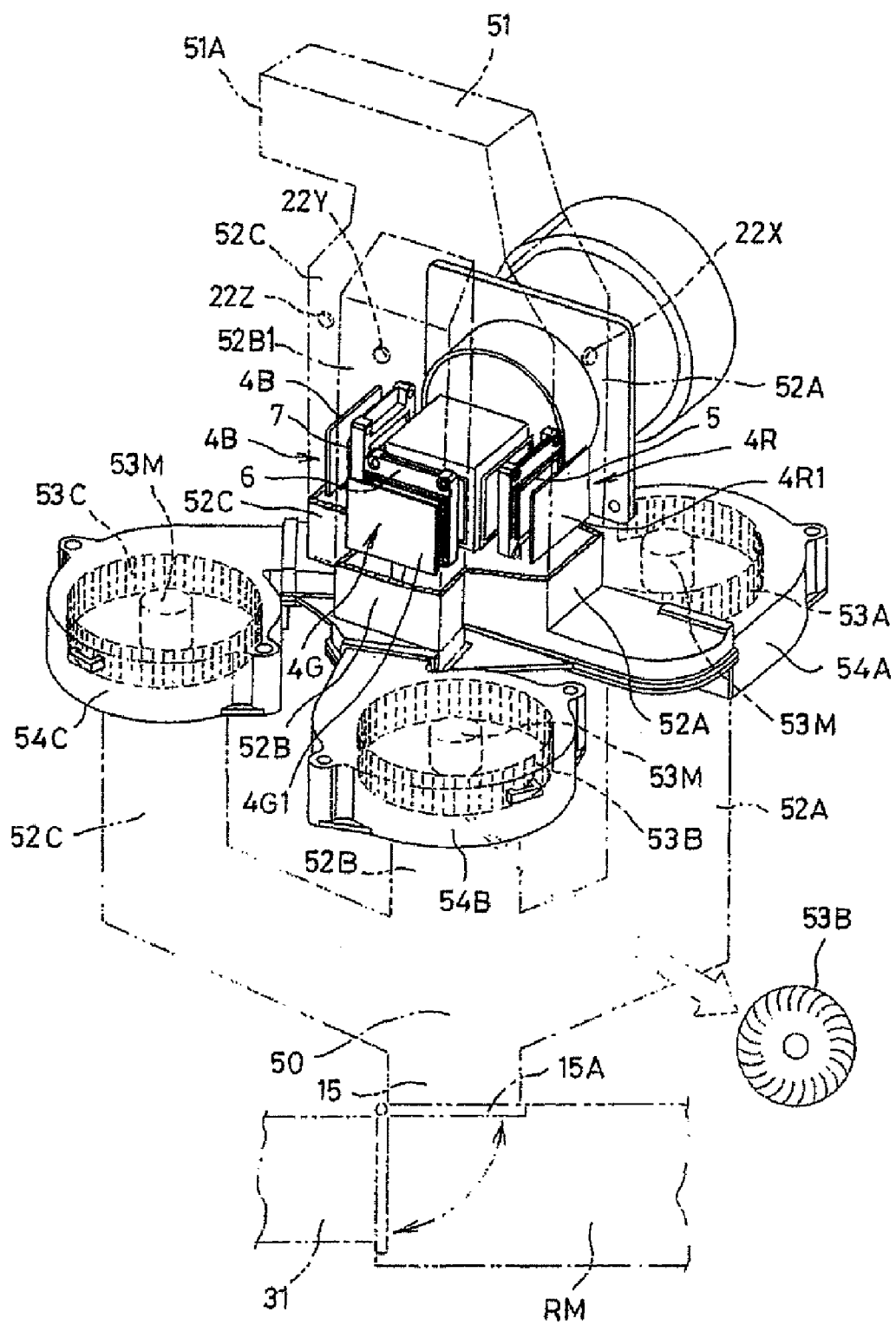
FIG. 22 is a partially-cut perspective view showing a duct structure of an optical device distributed cooling system in Embodiment 3 of the projector apparatus according to the present invention.

Embodiment 3 adopts a distributed cooling system of the optical device 4, differed from this cooling system of the optical device 4 within the single cooling space. In this distributed cooling system, as shown in FIG. 22, three branched cold air passages are constituted to branch the cold air introduced through the cold air inlet port 15, and each space for housing one face of the prism 10 and the liquid crystal panel and polarization plate of each transmissive liquid crystal light bulb 4R, 4G, 4B disposed in opposition to this face is formed within each of the three branched cold air passage. This configuration will be described below in detail.

In this distributed cooling system, as shown in FIG. 22, the optical chamber HM comprises:

a red optical element 4R for modulating a red component light according to red image information;

a green optical element 4G for modulating a green component light according to green image information;

a blue optical element 4B for modulating a blue component light according to blue image information;

a prism 10 that is a color composition part for composing image light of each color modulated by each optical element 4R, 4G, 4B;

a first cold air passage 52A for distributing cold air, the passage including the red optical element and a first incident surface 10A through which the red image light output from the red optical element enters into the prism 10 that is the color composition part;

a second cold air passage 52B for distributing cold air, the passage including the green optical element and a second incident surface 10B through which the green image light output from the green optical element enters into the prism 10 that is the color composition part; and a third cold air passage 52C for distributing cold air, the passage including the blue optical element and a third incident surface 10C through which the blue image light output from the blue optical element enters into the prism 10 that is the color composition part, in which the cold air introduced through the cold air inlet port 15 is branched to the first cold air passage 52A, the second cold air passage 52B and the third cold air passage 52C.

This Configuration Will be Described Below in More Detail.

The cold air inlet port 15 is connected to an inflow-side duct 50, and the cold air outlet port 16 is connected to an exit side 51A of an outflow-side duct 51. An air passage connecting the inflow-side duct 50 to the outflow-side duct 51 is composed of branched ducts 52A, 52B and 52C constituting the three branched cold air passages. Air flowing from the inflow-side duct 50 is branched to the three branched ducts 52A, 52B and 52C and carried toward the outflow-side duct 51. A function part having the same form as in the configuration of Embodiment 1 is shown by the same reference number.

In FIG. 22, although the branched ducts 52A, 52B and 52C are shown in a manner such that they are cut in the middle, the branched duct 52A forms a first space for housing one face 10A of the cross dichroic prism 10 and the liquid crystal panel 5 and polarization plates 4R1 and 4R2 of the transmissive liquid crystal light bulb 4R for red R. The branched duct 52B forms a second space for housing one face 10B of the cross dichroic prism 10 and the liquid crystal panel 6 and polarization plates 4G1 and 4G2 of the transmissive liquid crystal light bulb 4G for green G. The branched duct 52C forms a third space for housing one face 10C of the cross dichroic prism 10 and the liquid crystal panel 7 and polarization plates 4B1 and 4B2 of the transmissive liquid crystal light bulb 4B. The optical chamber HM is constituted by these first space, second space and third space.

In the branched ducts 52A, 52B and 52C, cold air circulating blowers 53A, 53B and 53C rotated by electric motors 53M are stored respectively within fan casings 54A, 54B and 54C provided in a part thereof. Although the cold air circulating blowers 53A, 53B and 53C are designed as a sirocco fan or turbo fan to circumferentially carry the air flowing from the axial direction of the fan, an axial fan such as a propeller fan can be also adapted.

By the operation of the cold air circulating blower 17 and the cold air circulating blowers 53A, 53B and 53C, the air in the cooling chamber RM enters into the inflow-side duct 50 through the cold air inlet port 15, flows in the branched ducts 52A, 52B and 52C, and reaches the cold air outlet port 16 through the outflow-side duct 51. Therefore, similarly to Embodiment 1, the cold air cooled by the cooling part 11A of the cooling chamber RM in the cooling mode of the optical device 4 cools the optical device 4 including the three faces of the prism 10 while it flows in the branched ducts 52A, 52B and 52C.

The cooling control of the optical device 4 is performed by the operation of the controller 20 based on the temperature detection by the optical part temperature sensor 22 similarly to Embodiment 1. In this case, the optical part temperature sensor 22 can be provided in a part 22A exposed to cold air of the cold air inlet port 15 or a part 22B exposed to cold air of the cold air outlet port 16 to perform the temperature control similarly to Embodiment 1.

Since the distributed cooling system using the branched ducts 52A, 52B and 52C is adapted in Embodiment 3, not the one optical part temperature sensor 22 as in Embodiment 1 but optical part temperature sensors 22X, 22Y and 22Z can be provided respectively in the branched ducts 52A, 52B and 52C to detect the temperature of cold air after cooling each liquid crystal light bulb and the prism face corresponding thereto of the optical device 4.

According to this, even if the liquid crystal light bulbs 4R, 4G and 4B are differed in heating value, the rotating speeds of corresponding cold air circulating blowers of the cold air circulating blowers 53A, 53B and 53C are variably controlled by the controller 20 so as to increase the cold air quantity carried in the branched duct housing the liquid crystal light bulb with large heating value and reduce the cold air quantity carried in the branched duct housing the liquid crystal light bulb with low heating value, whereby the optical device 4 can be controlled to an appropriately cooling state. When all the optical part temperature sensors 22X, 22Y and 22Z detect a predetermined low temperature, the operation of the compressor 11P, the cold air circulating blowers 17, 53A, 53B and 53C, and the radiating blower 18 is stopped. When the temperature is raised due to this stoppage, and at least one of the optical part temperature sensors 22X, 22Y and 22Z detects the raised predetermined temperature, the operation of the compressor 11P, the cold air circulating blowers 17, 53A, 53B and 53C, and the radiating blower 18 is restarted.

In this distributed cooling system, although the part of the branched ducts 52A, 52B and 52C may form the optical chamber HM, the part shown by the optical device 4 in FIG. 3, for example, can be stored as a component part shown in FIG. 22 in the optical chamber HM enclosed by the adiabatic wall DH. In this case, the part of the prism 10 and the transmissive liquid crystal light bulbs 4R, 4G and 4B in FIG. 1 corresponds to the component part shown in FIG. 22, and this part is stored in the optical chamber HM enclosed by the adiabatic wall DH.

When the temperature control specific to each of the branched ducts 52A, 52B and 53C is not performed, the cold air circulation can be performed by the cold air circulating blower 17 without the cold air circulating blowers 53A, 53B and 53C.

In this branched cold air passage system, also, the external air (ambient air) introducing operation mode for cooling the optical device 4 by introducing external air (ambient air) without operation of the cooling unit 11 can be set when the temperature of external air (ambient air) is low, similarly to Embodiment 1, and the internal air circulation mode for cooling the optical device 4 by the operation of the cooling unit 11 can be set when the temperature of external air (ambient air) is high. After completion of the external air (ambient air) introducing operation mode and the internal air circulation mode, the drying operation mode is set similarly to Embodiment 1, whereby the moisture in the cooling chamber RM can be prevented from reaching the optical device 4.

In the above-mentioned Embodiments 1 to 3, each of the opening and closing mechanisms (damper mechanisms) is never limited to the above-mentioned structure, and any mechanism having the same function as the above can be adapted. Further, functional deterioration by dust can be suppressed by providing filters for preventing intrusion of dust respectively on the cold air inlet port 15 and each of the external air inlet ports 25, 27, 29, and 40.

[Embodiment 4]

In addition to the above-mentioned form of the distributed cooling system of the optical device 4 in Embodiment 3, another form of the distributed cooling system is shown in Embodiment 4. In this form, the inflow-side duct 50 connected to the cold air inlet port 15 on the inlet side and the outflow-side duct 51 connected to the cold air outlet port 16 on the outlet side in FIG. 22 are not provided.

Concretely, the branched duct 52A housing the transmissive liquid crystal light bulb 4R, the branched duct 52B housing the transmissive liquid crystal light bulb 4G and the branched duct 52C housing the transmissive liquid crystal light bulb 4B are disposed respectively on the three faces of the prism 10 as the duct structure, and the cold air circulating blowers 53A, 53B and 53C are provided corresponding to the branched ducts 52A, 52B and 52C respectively.

The component part in which the branched ducts 52A, 52B and 52C respectively housing the transmissive liquid crystal light bulbs 4R, 4G and 4B and including the cold air circulating blowers 53A, 53B and 53C are disposed so as to carry cold air to the three faces of the prism 10 is stored within the optical chamber HM enclosed by the adiabatic wall DH. The inlet side of the branched ducts 52A, 52B and 52C is opened into the optical chamber HM, and the outlet side of the branched ducts 52A, 52B and 52C is also opened into the optical chamber HM.

Accordingly, by the operation of the cold air circulating blower 17 and the cold air circulating blowers 53A, 53B and 53C, the air in the cooling chamber RM enters into the optical chamber HM through the cold air inlet port 15, then flows into the branched ducts 52A, 52B and 52C from the inlet side thereof to cool the three faces of the prism 10 and the transmissive liquid crystal light bulbs 4R, 4G and 4B, respectively, and outflows to the optical chamber HM from the outlet side of the branched ducts 52A, 52B and 52C. The cold air outflowing to the optical chamber HM is returned to the cooling part 11A of the cooling chamber RM through the cold air outlet port 16, re-cooled therein, and circulated in the same manner as the above.

According to such a structure, the inflow-side duct 50 and the outflow-side duct 51 in Embodiment 3 are dispensed with, whereby the flexibility of layout in the optical chamber HM is enhanced.

[Embodiment 5]

A configuration in Embodiment 5 of the projector apparatus according to the present invention will be described in detail in reference to the drawings. Although a discharge type light source lamp is adapted in the following embodiment, the present invention can be carried out in a projector apparatus using a semiconductor laser element of each of three primary colors, and the type of the light source is never limited.

Figure 23:
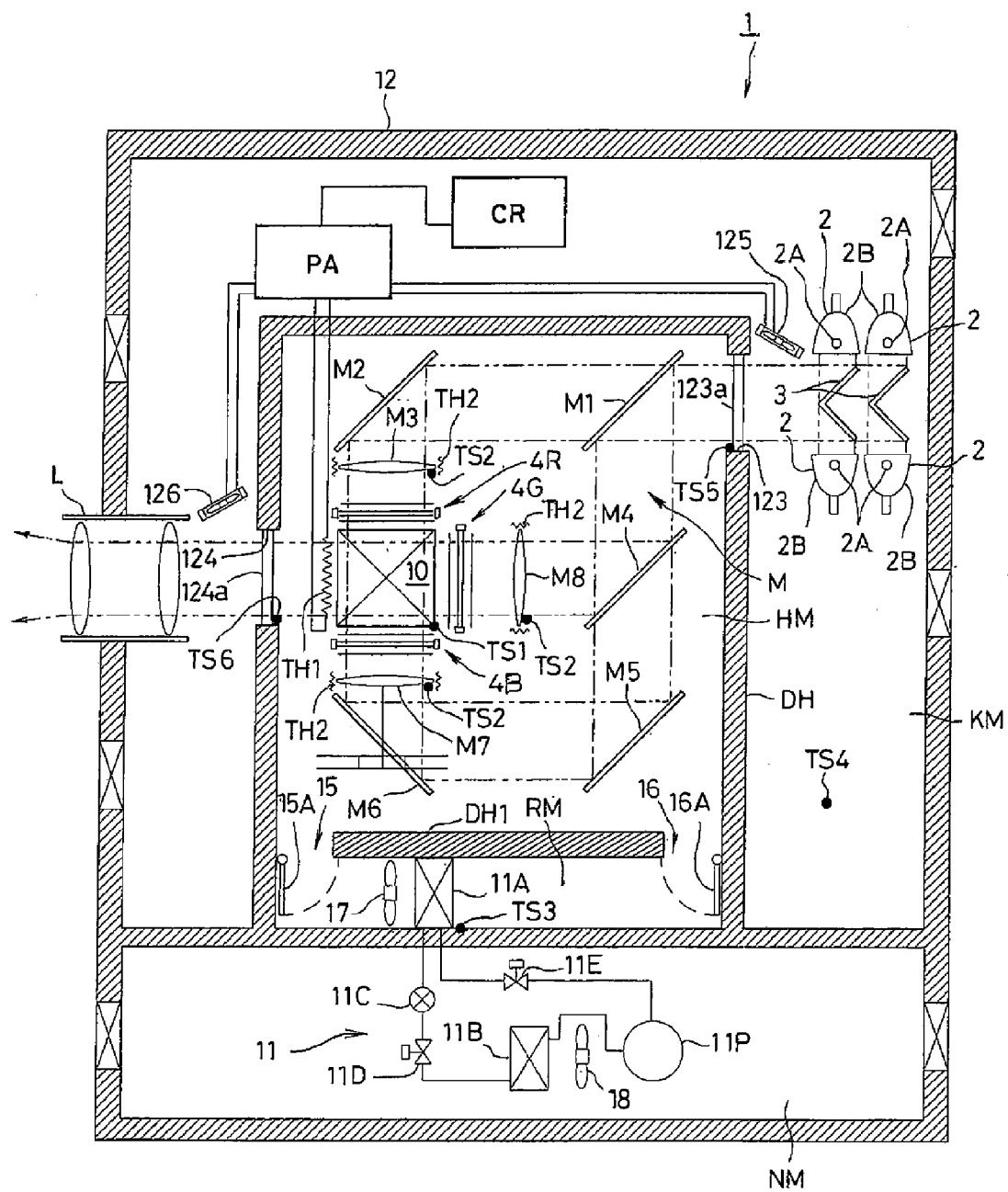
FIG. 23 is a schematic plan view showing a configuration in Embodiment 5 of the projector apparatus according to the present invention.
Figure 24:
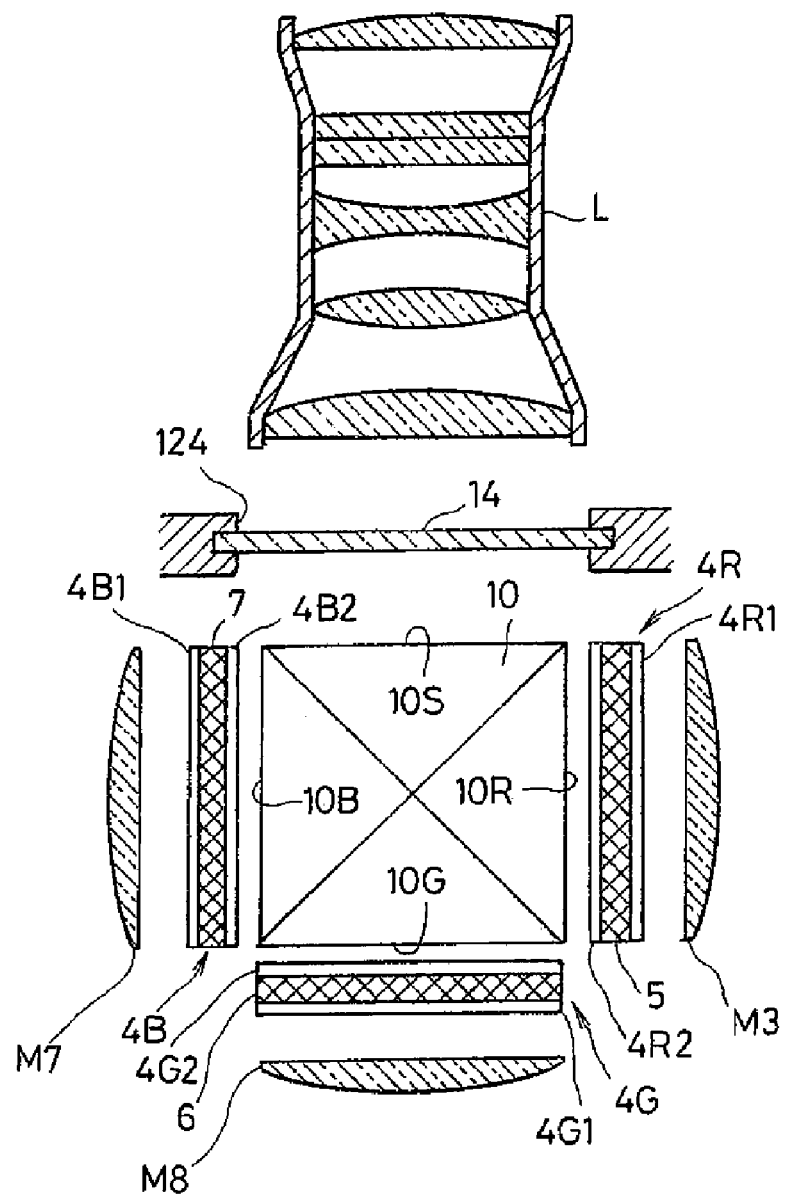
FIG. 24 is an illustrative view of the structure of a color composition optical system in the projector apparatus of FIG. 23.

FIG. 23 schematically shows the configuration in Embodiment 5 of the projector apparatus 1 according to the present invention, wherein a uniform illumination optical system 3 as the light source is provided with two or more (four in this embodiment) light source lamps 2A such as metal halide lamps or ultrahigh mercury lamps. Each of the light source lamps 2A is mounted on a reflector 2B so as to reflect emitted light thereof forward, and all the lights are converged into a parallel luminous flux by a total reflection mirror to allow uniform illumination.

A color separation optical system M for separating the parallel luminous flux incident from the uniform illumination optical system 3 into three primary colors (R), (G) and (B) comprises a first dichroic mirror M1, a second dichroic mirror M4 and reflecting mirrors M6, M2 and M5. The first dichroic mirror M1 transmits light of a wavelength band of red (R) and reflects light of a wavelength band of cyanogen series. The light of the red (R) wavelength band transmitted by the first dichroic mirror M1 is changed in optical path by the reflection mirror M6, and incident on the color composition optical system.

The light of the cyanogen wavelength band reflected by the first dichroic mirror M1 and changed in optical path is guided to the second dichroic mirror M4. The second dichroic mirror M4 transmits light of a wavelength band of blue (B), and reflects light of a wavelength band of green (G), and the light of the green (G) wavelength band is changed in optical path thereby and incident on the color composition optical system. The light of the blue (B) wavelength band transmitted by the second dichroic mirror M4 is changed in optical path by the reflection mirror M5, and incident on the color composition optical system.

In a color composition optical system including each optical element as a component thereof disposed in the center of the color separation optical system M as shown in FIG. 23, irradiation surfaces 2R, 2G and 2B of the primary color lights of three primary colors generated by the color separation optical system M as described above are formed on three side surfaces of a color composition prism (dichroic prism) 10. The red primary color light (R) is projected to the irradiation surface 2R through a red (R) condenser lens M3, the green primary color light (G) is projected to the irradiation surface 2G through a green (G) condenser lens M8, and the blue primary color light (B) is projected to the irradiation surface 2B through a blue (B) condenser lens M7.

The primary color lights (R), (G) and (B) transmitted respectively by the red (R) condenser lens M3, the green (G) condenser lens M8, and the blue (B) condenser lens M7 are incident on the liquid crystal light bulb 4R for red (R), the liquid crystal light bulb 4G for green (G), and the liquid crystal light bulb 4B for blue (B) so as to be modulated according to image information. The liquid crystal light bulb 4R for red (R) includes a liquid crystal panel 5 for red (R) disposed between an incident-side polarization plate 4R1 for red (R) and an outgoing-side polarization plate 4R2 for red (R), the liquid crystal light bulb 4G for green (G) includes a liquid crystal panel 6 for green (G) disposed between an incident-side polarization plate 4G1 for green (G) and an outgoing-side polarization plate 4G2 for green (G), and the liquid crystal light bulb 4B for blue (B) includes a liquid crystal panel 7 for blue (B) disposed between an incident-side polarization plate 4B1 for blue (B) and an outgoing-side polarization plate 4B2 for blue (B).

In the red (R) liquid crystal light bulb 4R, the green (G) liquid crystal light bulb 4G, and the blue (B) liquid crystal light bulb 4B, in order to make a specific linear polarized component incident on each of the red (R) liquid crystal panel 5, the green (G) liquid crystal panel 6, and the blue (B) liquid crystal panel 7, luminous fluxes of the primary colors (R), (G) and (B) are aligned in a predetermined polarizing direction (P-polarized) by the red (R) incident-side polarization plate 4R1, the green (G) incident-side polarization plate 4G1, and the blue (B) incident-side polarization plate 4B1, the respective P-polarized lights are modulated by the red (R) liquid crystal panel 5, the green (G) liquid crystal panel 6, and the blue (B) liquid crystal panel 7, and only S-polarized light components of the modulated lights are transmitted by the red (R) outgoing-side polarization plate 4R2, the green (G) outgoing-side polarization plate 4G2, and the glue (B) outgoing-side polarization plate 4B2, respectively. Each of the thus-modulated primary color lights (R), (G) and (B) is incident on the cross dichroic prism 10 through the irradiation surface 2R, 2G, 2G, and composed as a projection light, and the projection light is emitted from the outgoing face 2S, and enlarged and projected on a screen or the like through a projection lens L.

The thus-constituted color separation optical system M and color composition system are disposed within an optical chamber HM covered with the adiabatic wall DH on the inside of a box unit 12 in the projector apparatus 1 as shown in FIG. 23. Further, a part of the optical chamber HM is partitioned by an adiabatic wall DH1 to form an internally airtight cooling chamber RM. A cooling part (cooler) 11A is provided within the cooling chamber RM, and cold air heat-exchanged by the cooling part 11A is carried in one direction by a cold air circulating blower (blowing fan) 17, and circulated within the optical chamber HM through a cold air inlet port 15 and a cold air outlet port 16.

The cold air inlet port 15 and the cold air outlet port 16 are provided with opening and closing mechanisms (dampers) 15A and 16A respectively, and the cold air inlet port 15 and the cold air outlet port 16 are closed, upon stoppage of the operation of the apparatus body, by the opening and closing mechanisms 15A and 16A to prevent the inflow of the cold air in the cooling chamber RM into the optical chamber HM, whereby the efficiency of dew preventing treatment of the optical device is enhanced. The "stoppage of the operation" includes both normal stoppage of the operation of the projector apparatus and abnormal stoppage thereof due to shutdown of external power supply (an accident such as service interruption). For ensuring a further high cooling effect, the cooling part 11A is connected to a vapor compression refrigeration circuit (refrigeration unit) 11, although a thermoelectric conversion element (Peltier element) can be adapted as the cooling part 11A.

The refrigeration circuit 11 is built in a radiation chamber NM having air absorbing and discharging function within the apparatus body in the following example, although it may be separately set out of the apparatus body. In FIG. 23, high-temperature and high-pressure refrigerant compressed by a compressor 11P is reduced in temperature by heat exchange with external air by a radiating blower 18 of a radiation part 11B, and rendered to low-temperature and high-pressure refrigerant. The refrigerant is successively decompressed in a refrigerant expander 11C by narrowing its flow passage and evaporated in the cooling part 11A, and the cooling is performed by an endothermic effect at that time. A solenoid valve 11D performs opening and closing of a refrigerant passage between the radiation part 11B and the refrigerant expander 11C, and a solenoid valve 11E performs opening and closing of a refrigerant passage between the cooling part 11A and the compressor 11P.

While the refrigeration circuit 11 is disposed in the radiation chamber NM in this way, the light source lamps 2A, the reflectors 2B, the total reflection mirror and the projection lens L which constitute the uniform illumination optical system 3 are disposed within a light source chamber KM having air absorbing and discharging function. The airtight state of the optical chamber HM is maintained by the adiabatic wall DH by disposing a translucent member 123a on a translucent window 123 formed to guide the parallel luminous flux emitted from the uniform illumination optical system 3 to the optical chamber HM, and disposing a translucent member 124a on a translucent window 124 formed to guide the emitted light from the cross dichroic prism 10 of the color composition system to the projection lens L.

According to the thus-constituted projector apparatus 1 of the present invention, when the operation of the apparatus body is started, the refrigeration circuit starts to operate to circulate the cold air generated in the cooling chamber RM to the optical chamber HM through the cold air inlet port 15 and the cold air outlet port 16 opened by the opening and closing mechanisms 15A and 16A, whereby the cross dichroic prism 10, the red (R) condenser lens M3, the green (G) condenser lens M8, the blue (B) condenser lens M7, the red (R) liquid crystal light bulb 4R, the green (G) liquid crystal light bulb 4G, the blue (B) liquid crystal light bulb 4B, and the like of the color composition optical system can be cooled.

Figure 25:
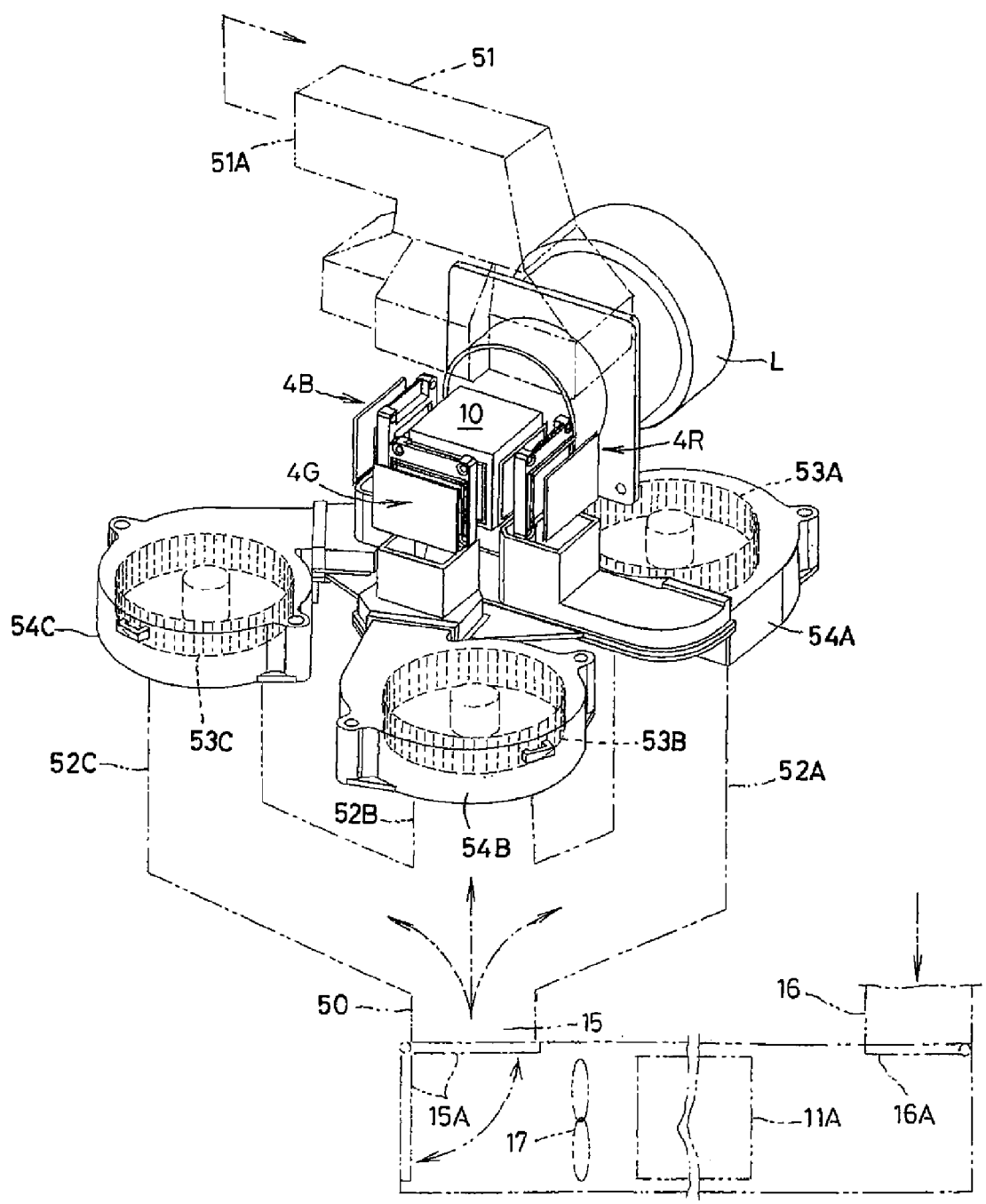
FIG. 25 is a view of the other example of the cooling mechanism in the projector apparatus of FIG. 23.

Although the color composition optical system is collectively cooled within the optical chamber HM in the above-described structure, each primary color element in the color composition system can be individually cooled according to the following structure. FIG. 25 shows an example of such a distributed cooling system, in which the cold air inlet port is connected to the inflow-side duct 50, and the cold air outlet port is connected to the exit side 51A of the outflow-side duct 51. A cold air passage connecting the inflow-side duct 50 to the outflow-side duct 51 is composed of three branched ducts 52A, 52B and 52C, and cold air flowing from the outflow-side duct 50 is branched to the three branched ducts 52A, 52B and 52B and carried toward the outflow-side duct 51.

The irradiation surface 2R of the cross dichroic prism 10, the red (R) condenser lens M3, and the red (R) liquid crystal light bulb 4R face a space in the opening upper part of the branched duct 52A. The irradiation surface 2G of the cross dichroic prism 10, the green (G) condenser lens M8, and the green (G) liquid crystal light bulb 4G face a space in the opening upper part of the branched duct 52B, and the irradiation surface 2B of the cross dichroic prism 10, the blue (B) condenser lens M7, and the blue (B) liquid crystal light bulb 4B face a space in the opening upper part of the branched duct 52C.

In the branched ducts 52A, 52B and 52C, cold air circulating blowers 53A, 53B and 53C rotated by electric motors are stored respectively within fan casings 54A, 54B and 54C provided in a part thereof. Although the cold air circulating blowers 53A, 53B and 53C are designed as a sirocco fan or turbo fan to circumferentially carry the cold air flowing from the axial direction.

By the operation of the cold air circulating blower 17 and the cold air circulating blowers 53A, 53B and 53C, the cold air in the cooling chamber enters into the inflow-side duct 50 through the cold air inlet port 15, flows in the branched ducts 52A, 52B and 52C, and returns to the cold air outlet port 16 through the outflow-side duct 51. According to this, each element of the color composition optical system can be cooled with the cold air generated by the cooling part 11A of the cooling chamber RM.

According to this structure, even if the red (R) liquid crystal light bulb 4R, the green (G) liquid crystal light bulb 4G and the blue (B) liquid crystal light bulb 4B are mutually differed in heating value, the rotating speeds of corresponding cold air circulating blowers of the cold air circulating blowers 53A, 53B and 53C are variably controlled so as to increase the cold air quantity carried in the branched duct corresponding to the liquid crystal light bulb with large heating value and reduce the cold air quantity carried in the branched duct corresponding to the liquid crystal light bulb with low heating value, whereby the red (R) liquid crystal light bulb 4R, the green (G) liquid crystal light bulb 4G, and the blue (B) liquid crystal light bulb 4B can be controlled to an appropriate cooling state.

The dew condensation countermeasure for the cross dichroic prism 10, the red (R) condenser lens M3, the green (G) condenser lens M8, and the blue (B) condenser lens M8 constituting the color composition optical system in the present invention will be then described. As described before, the dew condensation is caused when the temperature of each element of the color composition optical system becomes lower than the temperature of dew condensation water. Therefore, the temperatures of the cross dichroic prism 10, the red (R) condenser lens M3, the green (G) condenser lens M8, the blue (B) condenser lens M8 and dew condensation water must be regularly monitored. It is ideal that, upon power-off by stoppage of the operation of the apparatus body, the temperatures of the cross dichroic prism 10, the red (R) condenser lens M3, the green (G) condenser lens M8, and the blue (B) condenser lens M8 rise preceding to the temperature rise of the dew condensation water.

Figure 26:
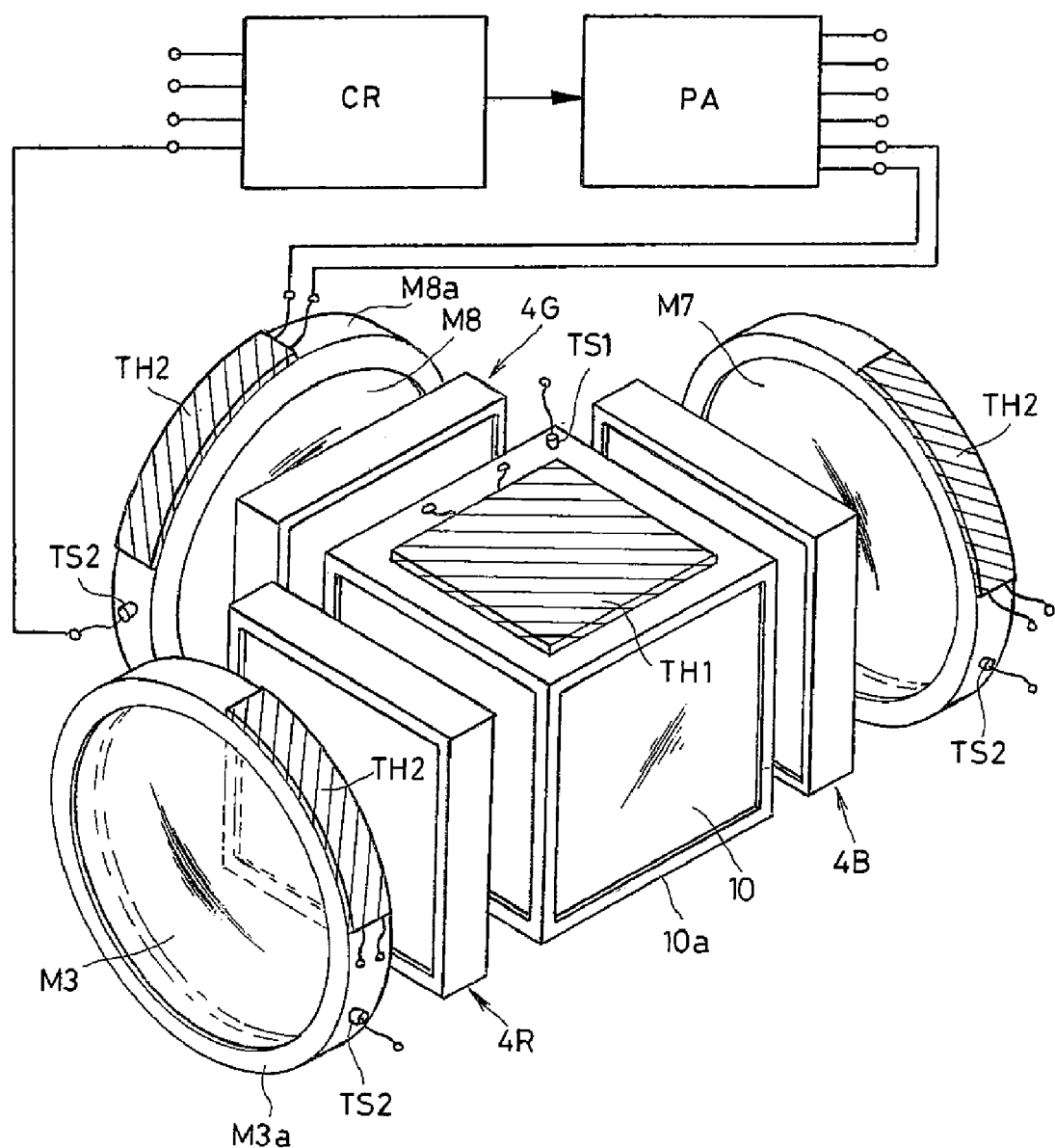
FIG. 26 is a perspective view showing the structure of the color composition optical system in the projector apparatus of FIG. 23.

In the present invention, therefore, temperature sensors and electric heaters are provided in essential parts within the projector apparatus 1 to heat the cross dichroic prism 10, the red (R) condenser lens M3, the green (G) condenser lens M8, and the blue (B) condenser lens M8 which are the optical elements of the color composition optical system. Namely, as shown in FIG. 26, an electric heater TH1 is stuck to a heat transfer frame 2a of the cross dichroic prism 10, electric heaters TH2 are stuck respectively to heat transfer frames 6a of the red (R) condenser lens M3, the green (G) condenser lens M8, and the blue (B) condenser lens M8, and each of the electric heater TH1 and TH2 is connected to an auxiliary power source PA to be controlled by a controller CR.

As the electric heaters TH1 and TH2, a thermoelectric conversion element (Peltier element) can be adapted. Otherwise a thin film-like transparent heater of tin oxide or the like may be formed on each surface of the cross dichroic prism 10, the red (R) condenser lens M3, the green (G) condenser lens M8 and the blue (B) condenser lens M8. As the auxiliary power source PA, a primary battery (dry battery), a secondary battery (storage battery) or the like can be appropriately adapted.

Further, a temperature sensor TS1 is provided on the cross dichroic prism 10, and temperature sensors TS2 are provided respectively on the red (R) condenser lens M3, the green (G) condenser lens M8, and the blue (B) condenser lens M8, and temperature detection signals detected by the respective temperature sensors TS1 and TS2 are guided to the controller part CR. A temperature detection signal from a temperature sensor TS3 provided in a dew condensation water storage part of the cooling part 11A is also guided to the controller CR. According to this, relative temperature differences of the dew condensation water with the cross dichroic prism 10, the red (R) condenser lens M3, the green (G) condenser lens M8, and the blue (B) condenser lens M8 can be detected based on the temperature detection signals detected by the temperature sensors TS1 and TS2 and the temperature sensor TS3.

In the present invention, a temperature sensor TS4 is further provided in the light source chamber KM within the apparatus, temperature sensors TS5 and TS6 are disposed in the vicinity of the translucent windows 123 and 124 of the optical chamber HM, and temperature detection signal detected by the temperature sensors TS5 and TS6 are guided to the controller CR. According to this, a relative temperature difference between the light source chamber KM and the optical chamber HM can be detected. In the present invention, blowing fans 125 and 126 for blowing air toward the translucent members 123a and 124a of the translucent windows 123 and 124 are provided to prevent dew condensation on the translucent members 123a and 124a, and the blowing fans 125 and 126 are also controlled by the controller CR.

Figure 27:
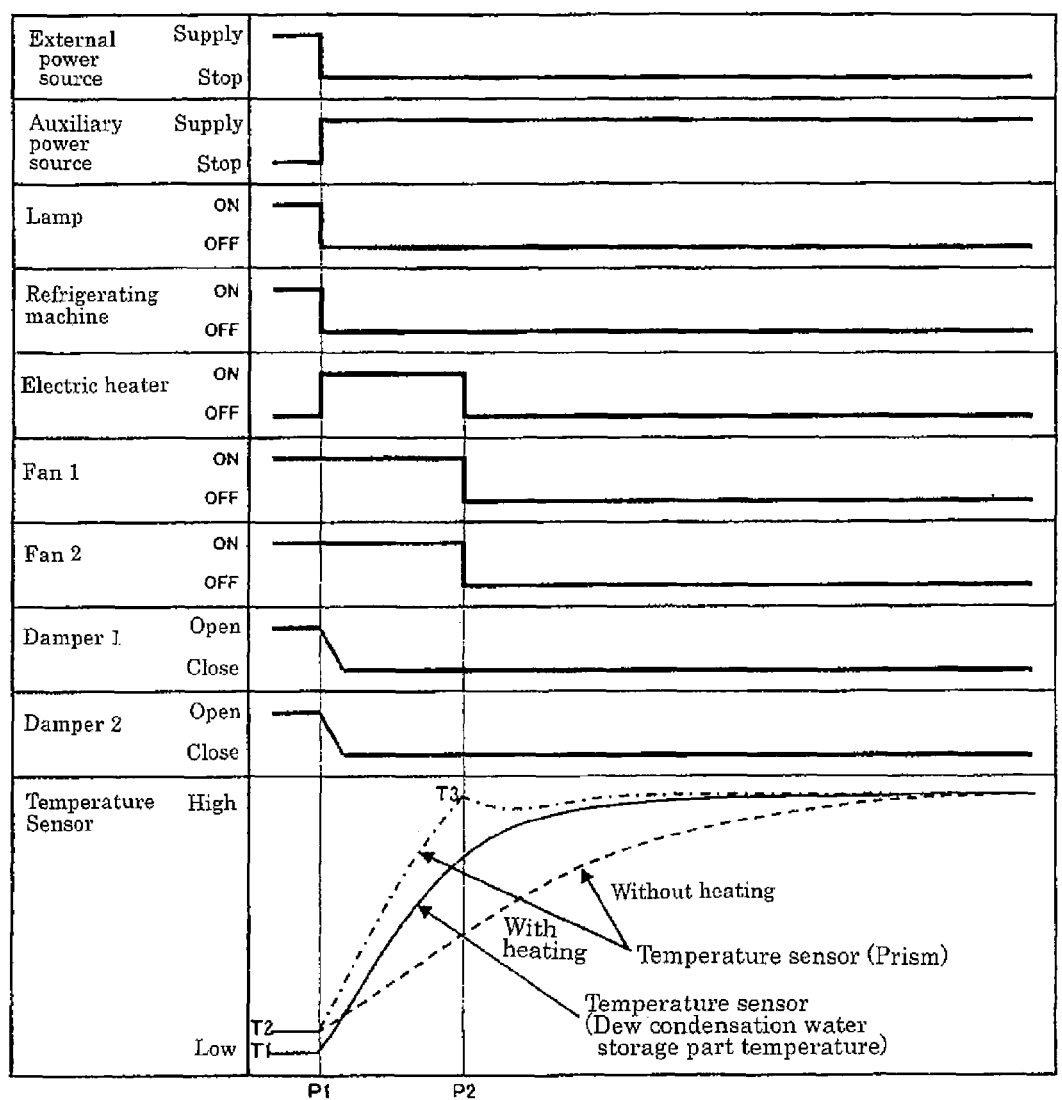
FIG. 27 is a diagram illustrating a control flow up to prevention of dew condensation in the projector apparatus of FIG. 23.

A control flow up to dew condensation prevention in the thus-constituted present invention will be then described in reference to FIG. 27. The supply of power from the auxiliary power source PA to the electric heaters TH11 and TH2 is stopped while the operation of the projector apparatus 1 of the present invention is continued, or up to a time P1 at which the power is off to stop this operation.

When the power supply to the apparatus is stopped at the time P1 at which the operation of the projector apparatus 1 is stopped, the light emission of the light source lamps 2A is stopped, and the operation of the refrigerator is also stopped. Simultaneously, the operation of the cold air circulating blower 17 is stopped, while the cold air inlet port 15 and the cold air outlet port 16 are closed by the operation of the opening and closing mechanisms 15A and 16B respectively to prevent inflow of cold air from the cooling chamber RM to the optical chamber HM, and the supply of power from the auxiliary power source PA to the electric heaters TH1 and TH2 is started. At that time, the flow path of the refrigeration circuit is closed by solenoid valves 11D and 11E to prevent the inflow of high-temperature refrigerant into the cooling part 11A, whereby the temperature rise of the cooling part 11A can be prevented.

The temperature sensor TS1, each of the temperature sensors TS2 and the temperature sensor TS3 regularly monitor the temperature of the cross dichroic prism 10, the temperature of each of the red (R) condenser lens M3, the green (G) condenser lens M8, the blue (B) condenser lens M7, and the temperature of dew condensation water in the dew condensation water storage part respectively, and until the operation of the apparatus body is stopped, it is checked by the controller CR that temperature T1 of dew condensation water is lower than temperature T2 of the cross dichroic prism 10, the red (R) condenser lens M3, the green (G) condenser lens M8 and the blue (B) condenser lens M7. If the cross dichroic prism 10, the red (R) condenser lens M3, the green (G) condenser lens M8, and the blue (B) condenser lens M7 are allowed to stand without heating upon stoppage of the operation of the apparatus body in such a state, the temperature T2 of the cross dichroic prism 10, the red (R) condenser lens M3, the green (G) condenser lens M8 and the blue (B) condenser lens M7 which are cooled up to then gently rises, while the temperature T1 of dew condensation water relatively rapidly rises, causing dew condensation on the cross dichroic prism 10, the red (R) condenser lens M3, the green (G) condenser lens M8, and the blue (B) condenser lens M7.

However, since the power is supplied from the auxiliary power source PA to the electric heaters TH1 and TH2 simultaneously with the stoppage of operation of the apparatus body in the present invention, the temperature T2 of the cross dichroic prism 10, the red (R) condenser lens M3, the green (G) condenser lens M8 and the blue (B) condenser lens M7 can be maintained in a state in which it is higher than the temperature T1 of dew condensation water by immediately starting to rise by the heating, and the dew condensation can be prevented. Namely, when the power is off by a power switch of the projector apparatus 1, or even if the cold air inlet port 15 and the cold air outlet port 16 cannot be closed respectively by the opening and closing mechanisms 15A and 16A due to a failure of the control function by power shutdown by an abnormal cause such as an accident, the dew preventing treatment by the auxiliary power source PA can be surely started to prevent the dew condensation. In the normal power-off without the abnormal cause, power generated by an external power source can be supplied to the electric heaters TH1 and TH2 instead of the power supplied from the auxiliary power source PA.

When the heating by the electric heaters TH1 and TH2 is continued, and the temperature T1 of dew condensation water detected by the temperature sensor TS3 gets close to the temperature detected by the temperature sensors TS4-TS6, the power supply from the auxiliary power source PA to the electric heaters TH1 and TH2 is stopped, and the operation of the blowing fans 125 and 126 is stopped. Thereafter, the cause of dew condensation is solved since a saturated state is established in which the temperatures of dew condensation water, the cross dichroic prism 10, the red (R) condenser lens M3, the green (G) condenser lens M8 and the blue (B) condenser lens M7 are equal to the ambient temperature.

Although the timing of stopping the power supply from the auxiliary power source PA to the electric heaters TH1 and TH2 is determined relatively from the detection temperatures by the temperature sensors TH4-TH6 in the above, a timer which is operated at stoppage of apparatus power may be used to stop the supply of power after the lapse of a preset time which is needed for the cross dichroic prism 10, the red (R) condenser lens M3, the green (G) condenser lens M8 and the blue (B) condenser lens M7, and the dew condensation water to have a saturated temperature.

The projector apparatus according to the present invention is never limited by the above-mentioned embodiments, and various embodiments made on the basis of various changes and modifications without departing from the scope of the present invention are included in the present invention. The projector apparatus of the present invention can be applied to various projections such as super-large screen projection or large-area screen projection in various places as long as an external power source is available since it can project color image information with high luminance, high quality and low noise, and be operated in a maintenance-free manner.

The invention claimed is:

1. A projector apparatus comprising:
a light source;
an optical device for modulating a light emitted from the light source according to image information;
a projection lens for projecting the light modulated by the optical device as image light;
a cooling unit including a cooling part and a radiation part;
an optical chamber for housing the optical device;
a cooling chamber for housing the cooling part and supplying cold air heat-exchanged by the cooling part to the optical chamber; and
a radiation chamber for housing the radiation part,
the optical chamber and the cooling chamber connecting with each other through a cold air inlet port and a cold air outlet port while forming respectively heat-insulated spaces enclosed by adiabatic walls, wherein
the projector apparatus further comprises opening and closing mechanisms for opening and closing both or one of the cold air inlet port and the cold air outlet port,
a cold air circulation is performed in a cooling operation mode by opening the opening and closing mechanisms so that cold air cooled by the cooling part flows into the optical chamber through the cold air inlet port to cool the optical device therein, by means of a cold air circulating blower, and then returns to the cooling chamber through the cold air outlet port, and
inflow of moisture in the cooling chamber to the optical chamber is prevented in a stopping mode of the cooling operation by closing the opening and closing mechanisms.

2. The projector apparatus according to claim 1, wherein
the cooling unit is provided with a refrigeration circuit including a refrigerant compressor, a radiator, a refrigerant expander and a heat sink,
the cooling unit is set within the cooling chamber together with the cold air circulating blower, including the heat sink, and
the radiation part is set within the radiation chamber together with the radiating blower, including the refrigerant compressor and the radiator, and is further provided with a radiating blower for the light source.

3. The projector apparatus according to claim 2, wherein the optical chamber includes a heating means, and the heating means is started when the operation of the cooling unit is stopped or when the light emission of the light source is stopped.

4. The projector apparatus according to claim 3, wherein the projector apparatus further comprises an auxiliary power source disposed out of the optical chamber, and the auxiliary power source supplies power to the heating means when supply of external power is shut down.

5. The projector apparatus according to claim 4, wherein the opening and closing mechanisms prevent the outflow of the cold air from the cooling chamber to the optical chamber when the operation of the cooling unit is stopped or when the light emission of the light source is stopped.

6. The projector apparatus according to claim 2, wherein the opening and closing mechanisms prevent the outflow of the cold air from the cooling chamber to the optical chamber when the operation of the cooling unit is stopped or when the light emission of the light source is stopped.

7. The projector apparatus according to claim 1, wherein the optical chamber is provided with a heating means, and the heating means is started when the operation of the cooling unit is stopped or when the light emission of the light source is stopped.

8. The projector apparatus according to claim 7, wherein the projector apparatus further comprises an auxiliary power source disposed out of the optical chamber, and the auxiliary power source supplies power to the heating means when supply of external power is shut down.

9. The projector apparatus according to claim 8, wherein the opening and closing mechanisms prevent the outflow of the cold air from the cooling chamber to the optical chamber when the operation of the cooling unit is stopped or when the light emission of the light source is stopped.

10. The projector apparatus according to claim 1, wherein the opening and closing mechanisms prevent the outflow of the cold air from the cooling chamber to the optical chamber when the operation of the cooling unit is stopped or when the light emission of the light source is stopped.

11. A projector apparatus comprising:
a light source;
an optical device for modulating a light emitted from the light source according to image information;
a projection lens for projecting the light modulated by the optical device as image light;
a cooling unit including a cooling part and a radiation part;
an optical chamber for housing the optical device;
a cooling chamber for housing the cooling part and supplying cold air heat-exchanged by the cooling part to the optical chamber; and
a radiation chamber for housing the radiation part,
the optical chamber and the cooling chamber connecting with each other through a cold air inlet port and a cold air outlet port while forming respectively heat-insulated spaces enclosed by adiabatic walls, and
the cooling chamber including an external air introduction part for introducing external air outside the projector apparatus, wherein
the projector apparatus is provided with a cooling operation mode for cooling the optical device by performing a cold air circulation such that cold air cooled by the cooling part flows into the optical chamber through the cold air inlet port to cool the optical device therein and then returns to the cooling chamber through the cold air outlet port, and a drying operation mode for drying the cooling chamber by introducing the external air from the external air introduction part into the cooling chamber.

12. A projector apparatus comprising:
a light source;
an optical device for modulating a light emitted from the light source according to image information;
a projection lens for projecting the light modulated by the optical device as image light;
a cooling unit including a cooling part and a radiation part;
an optical chamber for housing the optical device;
a cooling chamber for housing the cooling part and supplying cold air heat-exchanged by the cooling part to the optical chamber; and
a radiation chamber for housing the radiation part,
the optical chamber and the cooling chamber connecting with each other through a cold air inlet port and a cold air outlet port while forming respectively heat-insulated spaces enclosed by adiabatic walls, and
the cooling chamber including an external air introduction part for introducing external air outside the projector apparatus, wherein
the projector apparatus is provided with a cooling operation mode for cooling the optical device by performing a cold air circulation such that cold air cooled by the cooling part flows into the optical chamber through the cold air inlet port to cool the optical device therein, by means of a cold air circulating blower, and then returns to the cooling chamber through the cold air outlet port; an external air introduction mode for cooling the optical device with the external air taken by the external air introduction part; and a drying operation mode for drying the cooling chamber by introducing the external air from the external air introduction part into the cooling chamber, and
the cooling operation state by the cooling part and the cooling operation state with the external air are switched based on temperature detection of an external air temperature sensor for detecting temperature of the external air.

13. A projector apparatus comprising:
a light source;
an optical device for modulating a light emitted from the light source according to image information;
a projection lens for projecting the light modulated by the optical device as image light;
a cooling unit including a cooling part and a radiation part;
an optical chamber for housing the optical device;
a cooling chamber for housing the cooling part and a cold air circulating blower, and supplying cold air heat-exchanged by the cooling part to the optical chamber; and
a radiation chamber for housing the radiation part,
the optical chamber and the cooling chamber connecting with each other through a cold air inlet port and a cold air outlet port while forming respectively heat-insulated spaces enclosed by adiabatic walls,
the cooling chamber including an external air introduction part for introducing external air outside the projector apparatus, and
the optical chamber connecting with the outside of the projector apparatus through an external air inlet port and an external air outlet port, wherein
the projector apparatus further comprises opening and closing mechanisms for opening and closing the cold air inlet port, the cold air outlet port, the external air inlet port, and the external air outlet port,
the projector apparatus is provided with operation modes based on the opening and closing control of the opening and closing mechanisms and the operation control of the cold air circulating blower, or a cooling operation mode by the cooling part for performing an air circulation such that cold air cooled by the cooling part flows into the optical chamber through the cold air inlet port to cool the optical device therein and then returns to the cooling chamber through the cold air outlet port; an external air introduction mode for cooling the optical device with the external air introduced into the optical chamber through the external air inlet port and then allowing the resulting air to flow to the outside of the projector apparatus through the external air outlet port; and a drying operation mode for drying the cooling chamber by introducing the external air into the cooling chamber, and
the cooling operation state by the cooling part and the cooling operation state with the external air are switched based on temperature detection of an external air temperature sensor for detecting temperature of the external air.

14. A projector apparatus comprising:
a light source;
an optical device for modulating a light emitted from the light source according to image information;
a projection lens for projecting the light modulated by the optical device as image light;
a cooling unit including a cooling part and a radiation part;
an optical chamber for housing the optical device;
a cooling chamber for housing the cooling part and a cold air circulating blower and supplying cold air heat-exchanged by the cooling part to the optical chamber, the cooling chamber disposed adjacently to the optical chamber; and
a radiation chamber for housing the radiation part and a radiating blower,
the optical chamber and the cooling chamber connecting with each other through a cold air inlet port and a cold air outlet port while forming respectively heat-insulated spaces enclosed by adiabatic walls,
the cooling chamber connecting with the outside of the projector apparatus through an external air inlet port and an external air outlet port, and
the cooling chamber connecting with the radiation chamber through a vent port, wherein
the projector apparatus further comprises opening and closing mechanisms for opening and closing the cold air inlet port, the cold air outlet port, the external air inlet port, the external air outlet port and the vent port,
the projector apparatus is provided with operation modes based on the opening and closing control of the opening and closing mechanisms, the operation control of the cold air circulating blower and the operation control of the radiating blower, or a cooling operation mode by the cooling part for performing an air circulation such that cold air cooled by the cooling part flows into the optical chamber through the cold air inlet port to cool the optical device and then returns to the cooling chamber through the cold air outlet port; an external air introduction mode for allowing the external air introduced into the cooling chamber through the external air inlet port to flow into the optical chamber through the cold air inlet port to cool the optical device and then allowing the resulting air to flow from the cold air outlet port to the radiation chamber through the vent port; and a drying operation mode for drying the cooling chamber by introducing the external air into the cooling chamber, and
the cooling operation state by the cooling part and the cooling operation state with the external air are switched based on temperature detection of an external air temperature sensor for detecting temperature of the external air.

* * * * *